United States Patent
Oka et al.

(10) Patent No.: US 9,361,551 B2
(45) Date of Patent: Jun. 7, 2016

(54) IMAGE FORMING APPARATUS THAT FORMS COLOR IMAGE BY SUPERIMPOSING PLURALITY OF IMAGES

(71) Applicant: CANON KABUSHIKI KAISHA, Tokyo (JP)

(72) Inventors: Yushi Oka, Abiko (JP); Shinichi Takata, Abiko (JP); Hiroshi Matsumoto, Toride (JP); Ryou Sakaguchi, Toride (JP); Kentaro Tamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/630,095

(22) Filed: Feb. 24, 2015

(65) Prior Publication Data

US 2015/0242714 A1 Aug. 27, 2015

(30) Foreign Application Priority Data

Feb. 25, 2014 (JP) .................................. 2014-034713

(51) Int. Cl.
| | |
|---|---|
| H04N 1/60 | (2006.01) |
| G06K 15/02 | (2006.01) |
| B41J 29/393 | (2006.01) |
| G03G 15/00 | (2006.01) |
| G06K 15/12 | (2006.01) |
| G03G 15/01 | (2006.01) |
| G06F 3/12 | (2006.01) |

(52) U.S. Cl.
CPC ............. *G06K 15/027* (2013.01); *B41J 29/393* (2013.01); *G03G 15/00* (2013.01); *G03G 15/0178* (2013.01); *G03G 15/55* (2013.01); *G06K 15/129* (2013.01); *G03G 15/5058* (2013.01); *G03G 2215/00569* (2013.01); *G03G 2215/00949* (2013.01); *G03G 2215/0161* (2013.01)

(58) Field of Classification Search
None
See application file for complete search history.

(56) References Cited

U.S. PATENT DOCUMENTS

| | | | |
|---|---|---|---|
| 8,837,994 | B2 | 9/2014 | Kuroki et al. |
| 2008/0226360 | A1 | 9/2008 | Sugiyama |
| 2012/0008154 | A1 | 1/2012 | Abe |
| 2015/0241808 | A1* | 8/2015 | Oka ...................... G03G 15/01 399/301 |

FOREIGN PATENT DOCUMENTS

| | | |
|---|---|---|
| EP | 2 320 276 A1 | 5/2011 |
| JP | 2012-133216 A | 7/2012 |

OTHER PUBLICATIONS

Yushi Oka, Shinshi Takata, Hiroshi Matsumoto, Ryou Sakaguchi, Kentaro Tamura, U.S. Appl. No. 14/626,185, filed Feb. 19, 2015.

* cited by examiner

*Primary Examiner* — Dov Popovici
(74) *Attorney, Agent, or Firm* — Fitzpatrick, Cella, Harper & Scinto

(57) ABSTRACT

An image forming apparatus includes a unit configured to correct a relative position of a first image and a second image, and a controller configured to form a first measurement image in a case where a first condition is satisfied, and to form the first measurement image and a second measurement image in a case where a second condition is satisfied. The controller is further configured to, in a case where the first condition is satisfied, determine whether or not the second condition is satisfied before the first condition is satisfied next, and in a case where the second condition is satisfied before the first condition is satisfied next, cause an image forming unit to form the first measurement image and the second measurement image.

6 Claims, 21 Drawing Sheets

FIG. 4

| PAPER TYPE | THICKNESS (UNIT:g/m²) | IMAGE FORMING SPEED | ACTUAL SPEED (UNIT:mm/s) |
|---|---|---|---|
| STANDARD PAPER 1 | 60~79 | FIRST IMAGE FORMING SPEED | 300 |
| STANDARD PAPER 2 | 80~99 | FIRST IMAGE FORMING SPEED | 300 |
| STANDARD PAPER 3 | 100~119 | THIRD IMAGE FORMING SPEED | 150 |
| THICK PAPER 1 | 120~139 | SECOND IMAGE FORMING SPEED | 100 |
| THICK PAPER 2 | 140~159 | SECOND IMAGE FORMING SPEED | 100 |
| THICK PAPER 3 | 160~179 | SECOND IMAGE FORMING SPEED | 100 |

FIG. 8A

| | THEORETICAL VALUE (μm) | MEASURED VALUE (μ sec) | THEORETICAL VALUE (μ sec) | MISREGISTRATION AMOUNT (μ sec) | MISREGISTRATION AMOUNT (μm) |
|---|---|---|---|---|---|
| | | | IMAGE FORMING SPEED (mm/s) | 300 | |
| BETWEEN Y AND M | 12700 | 42333 | 42328 | -5 | -2 |
| BETWEEN Y AND C | 25400 | 84667 | 84711 | 44 | 13 |
| BETWEEN Y AND K | 38100 | 127000 | 126973 | -27 | -8 |

FIG. 8B

| | THEORETICAL VALUE (μm) | MEASURED VALUE (μ sec) | THEORETICAL VALUE (μ sec) | MISREGISTRATION AMOUNT (μ sec) | MISREGISTRATION AMOUNT (μm) |
|---|---|---|---|---|---|
| | | | IMAGE FORMING SPEED (mm/s) | 100 | |
| BETWEEN Y AND M | 12700 | 127000 | 127552 | 552 | 55 |
| BETWEEN Y AND C | 25400 | 254000 | 255102 | 1102 | 110 |
| BETWEEN Y AND K | 38100 | 381000 | 382539 | 1539 | 154 |

FIG. 8C

| | THEORETICAL VALUE (μm) | MEASURED VALUE (μ sec) | THEORETICAL VALUE (μ sec) | MISREGISTRATION AMOUNT (μ sec) | MISREGISTRATION AMOUNT (μm) |
|---|---|---|---|---|---|
| | | | IMAGE FORMING SPEED (mm/s) | 150 | |
| BETWEEN Y AND M | 12700 | 84667 | 84616 | -51 | -8 |
| BETWEEN Y AND C | 25400 | 169333 | 169450 | 117 | 18 |
| BETWEEN Y AND K | 38100 | 254000 | 253936 | -64 | -10 |

F I G. 9A

| | DIFFERENCE BETWEEN MISREGISTRATION AMOUNTS AT FIRST AND SECOND IMAGE FORMING SPEEDS (μm) |
|---|---|
| BETWEEN Y AND M | 57 |
| BETWEEN Y AND C | 97 |
| BETWEEN Y AND K | 162 |

F I G. 9B

| | DIFFERENCE BETWEEN MISREGISTRATION AMOUNTS AT FIRST AND THIRD IMAGE FORMING SPEEDS (μm) |
|---|---|
| BETWEEN Y AND M | -6 |
| BETWEEN Y AND C | 5 |
| BETWEEN Y AND K | -2 |

F I G. 9C

| | COLOR MISREGISTRATION CORRECTION AMOUNT AT FIRST IMAGE FORMING SPEED (μm) | COLOR MISREGISTRATION CORRECTION AMOUNT AT SECOND IMAGE FORMING SPEED (μm) | COLOR MISREGISTRATION CORRECTION AMOUNT AT THIRD IMAGE FORMING SPEED (μm) |
|---|---|---|---|
| BETWEEN Y AND M | -2 | 55 | -2 |
| BETWEEN Y AND C | 13 | 110 | 13 |
| BETWEEN Y AND K | -8 | 154 | -8 |

IMAGE FORMING APPARATUS THAT FORMS COLOR IMAGE BY SUPERIMPOSING PLURALITY OF IMAGES

BACKGROUND OF THE INVENTION

1. Field of the Invention

The present invention relates to an image forming apparatus that forms, on a sheet of paper, a color image by superimposing a plurality of images in different colors.

2. Description of the Related Art

In a color image forming apparatus, a color image is formed by superimposing a plurality of images in different colors, and therefore so-called color misregistration occurs if formation positions of images in different colors are misaligned with respect to desired positions. As such color misregistration degrades the image quality, a color misregistration correction mechanism is necessary. U.S. Pat. No. 8,837,994 suggests detection of a color misregistration amount through formation of a pattern, and calculation of a correction amount for correcting color misregistration. Such color misregistration occurs due to, for example, expansion and shrinkage of components of an image forming apparatus.

While various types of paper are used in an image forming apparatus, a fixing heat amount differs depending on paper types. For example, a heat amount necessary for thick paper is larger than a heat amount necessary for standard paper. Hence, the image forming apparatus has a mode in which an image is formed at an image forming speed lower than an image forming speed applied to standard paper. It is known that a color misregistration amount attributed to expansion and shrinkage of optical components does not depend on an image forming speed. Therefore, once the image forming apparatus has calculated a correction amount for correcting color misregistration through formation of a pattern at the image forming speed for the standard paper, the calculated correction amount can be used mutually at all image forming speeds.

In recent years, paper types are becoming diverse, and the number of image forming speeds that can be set in an image forming apparatus is increasing accordingly. That is to say, the range of image forming speeds used in an image forming apparatus is becoming wider. As the range of image forming speeds has widened, it has been discovered that color misregistration attributed to deterioration of components involved in conveyance of sheets of paper and images is evident. For example, a driving roller that drives an intermediate transfer belt undergoes abrasion, and the intermediate transfer belt deteriorates by getting dirty from scattered toner. This may cause the intermediate transfer belt to slip with respect to the driving roller, in which case timings of transfer from photosensitive drums of different colors to the intermediate transfer belt are shifted, and color misregistration occurs. It has been discovered that a change in a slip amount corresponding to the state of deterioration of the intermediate transfer belt depends on an image forming speed. That is to say, a slip amount at the lowest image forming speed is larger than a slip amount at the highest image forming speed. Therefore, if color misregistrations at all image forming speeds are corrected using a color misregistration correction amount that has been decided on based on the highest image forming speed, a color misregistration amount becomes large especially at the lowest image forming speed. Conversely, if color misregistrations at all image forming speeds are corrected using a color misregistration correction amount that has been decided on based on the lowest image forming speed, a color misregistration amount becomes large especially at the highest image forming speed.

In order to correct such color misregistrations dependent on an image forming speed with high accuracy, it is sufficient to adopt a configuration in which color misregistration amounts are obtained at each of a plurality of image forming speeds. However, this configuration extends a period during which a user cannot form images, that is to say, downtime.

SUMMARY OF THE INVENTION

According to an aspect of the present invention, an image forming apparatus is capable of forming an image at a plurality of image forming speeds. The image forming apparatus includes: an image forming unit that has a first image forming part configured to form a first image of a first color and a second image forming part configured to form a second image of a second color different from the first color, and configured to form the image using the first image forming part and the second image forming part; an image bearing member configured to bear the first image and the second image, and to convey the first image and the second image; a controller configured to control the image forming unit to form a measurement image including a first measurement image of the first color and a second measurement image of the second color on the image bearing member; a measurement unit configured to measure the measurement image formed on the image bearing member; a determination unit configured to determine first information related to a relative position of the first measurement image and the second measurement image in a conveyance direction of the image bearing member based on a first measurement result of the measurement image, by the measurement unit, formed by the image forming unit at a first image forming speed, and to determine second information related to a relative position of the first measurement image and the second measurement image in the conveyance direction of the image bearing member based on a second measurement result of the measurement image, by the measurement unit, formed by the image forming unit at a second image forming speed different from the first image forming speed; a generating unit configured to generate correlation data based on the first information and the second information determined by the determination unit; and a correction unit configured to, in a case where the image forming unit forms the image at the first image forming speed, correct a relative position of the first image and the second image in the conveyance direction based on the first information determined by the determination unit, and to, in a case where the image forming unit forms the image at the second image forming speed, correct a relative position of the first image and the second image in the conveyance direction based on the first information determined by the determination unit and the correlation data generated by the generating unit. The controller is further configured to control the image forming unit to form the first measurement image in a case where a first condition is satisfied, and to control the image forming unit to form the first measurement image and the second measurement image in a case where a second condition is satisfied, and the controller is further configured to, in a case where the first condition is satisfied, determine whether or not the second condition is satisfied before the first condition is satisfied next, and in a case where the second condition is satisfied before the first condition is satisfied next, cause the image forming unit to form the first measurement image and the second measurement image.

Further features of the present invention will become apparent from the following description of exemplary embodiments with reference to the attached drawings.

BRIEF DESCRIPTION OF THE DRAWINGS

FIG. 4 shows a relationship between paper types and image forming speeds.

FIGS. 8A to 8C show examples of color misregistration amounts.

FIGS. 9A to 9C show examples of differences between color misregistration amounts and examples of correction amounts.

DESCRIPTION OF THE EMBODIMENTS

First Embodiment

Configuration

The following describes an electrophotographic image forming apparatus. However, the present invention is similarly applicable to an image forming apparatus that forms a multi-color image by individually forming a plurality of images in different colors and then superimposing the formed images. It should be noted that the image forming apparatus may be productized as any one of a printing apparatus, a printer, a copier, a multi-functional peripheral, and a facsimile apparatus.

Figure 1:
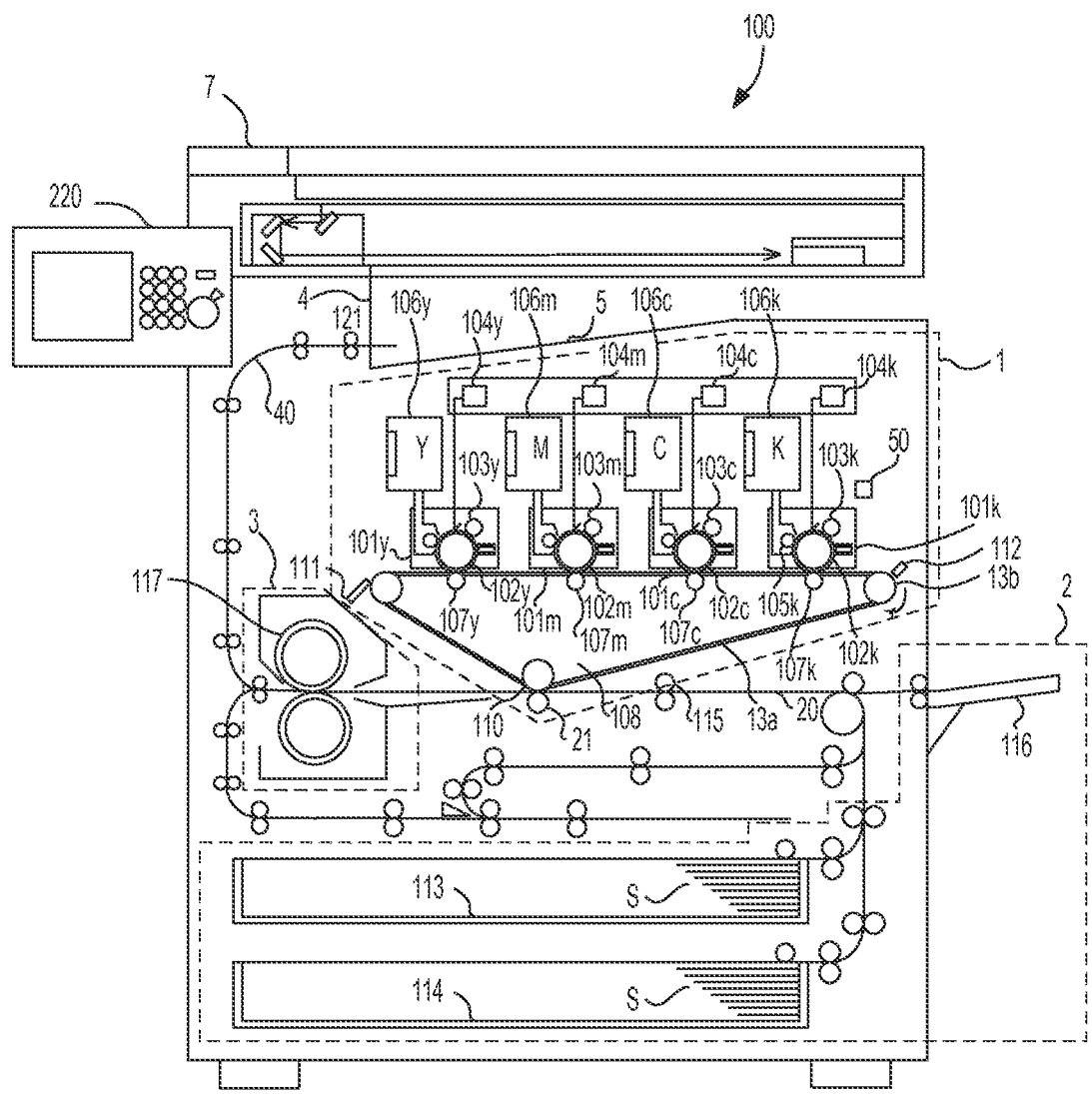
FIG. 1 shows a configuration of an image forming apparatus.

An image forming apparatus 100 will now be described with reference to FIG. 1. A printing unit 1 exemplarily represents a plurality of image forming units that form toner images in different colors at one of a plurality of image forming speeds, and is, for example, a printer engine that forms toner images. A paper feeder 2 is a unit that feeds paper S to the printing unit 1. The paper may be referred to as a recording material, a recording paper, a recording medium, a sheet, a transfer material, and a transfer paper. A fixing apparatus 3 is a unit that fixes a toner image on paper S. Toner reservoirs 106 are units that reserve store toner. It is assumed that the colors of toner used herein are yellow (Y), magenta (M), cyan (C), and black (K). In the drawings and the description, y, m, c and k denoting the colors of toner may be appended at the end of reference signs, but are normally omitted. A discharger 4 is a unit that conveys paper S on which a toner image has been fixed. A stacker 5 is a unit that stacks discharged sheets of paper. An image reader 7 is a unit that reads a document. An operation unit 220 is a unit to which instructions for the image forming apparatus 100 are input, and which displays information.

The printing unit 1 includes four process cartridges 101 corresponding to YMCK, which are attachable to and detachable from the image forming apparatus 100. The process cartridges 101 each include a photosensitive drum 102, a charge roller 103 that charges the photosensitive drum 102 by applying a predetermined voltage thereto, and a development sleeve 105 that performs development by causing toner to attach to a latent image formed on the photosensitive drum 102. The toner reservoirs 106 may constitute the process cartridges 101. Laser scanners 104 that render latent images on the photosensitive drums 102 are arranged above the process cartridges 101. An intermediate transfer unit 108 is arranged below the process cartridges 101. The laser scanners 104 are exposure units that cause laser beams modulated and output from laser diodes to scan the uniformly-charged photosensitive drums 102 in a longitudinal direction thereof (a main scanning direction) using rotating polygon mirrors or vibrating mirrors. A thermistor 50 disposed in the vicinity of the process cartridges 101 is one example of a detection unit that detects a temperature related to the image forming apparatus 100, and detects the internal temperature of the image forming apparatus 100. The intermediate transfer unit 108 includes an intermediate transfer belt 13a, a driving roller 13b, primary transfer rollers 107 that cause the intermediate transfer belt 13a to come into contact with the photosensitive drums 102, and an inner roller 110. In particular, the intermediate transfer unit 108 is one example of a carrier or an intermediate transfer member that carry a multi-color toner image formed by superimposing toner images in different colors which have been formed by the plurality of image forming units. Together with the inner roller 110, an outer roller 21 forms a transfer nip. A registration roller 115 controls a timing at which a sheet of paper S enters the transfer nip on a paper conveyance path 20. An intermediate transfer member cleaner 111 collects residual toner that has failed to be transferred by the inner roller 110, as well as adjustment toner images that are not intended to be transferred onto a sheet of paper S. A pattern sensor 112 detects edges of changes in darkness/lightness of a pattern created on the intermediate transfer belt 13a. The paper feeder 2 includes a first paper feeding cassette 113, a second paper feeding cassette 114, and a manual tray 116. The fixing apparatus 3 includes a fixing roller 117 that rotates while heating a roller surface. A sheet of paper S is discharged to the stacker 5 by a pair of paper discharge rollers 121 arranged on a paper discharge path 40.

(Block Diagram)

Figure 2:
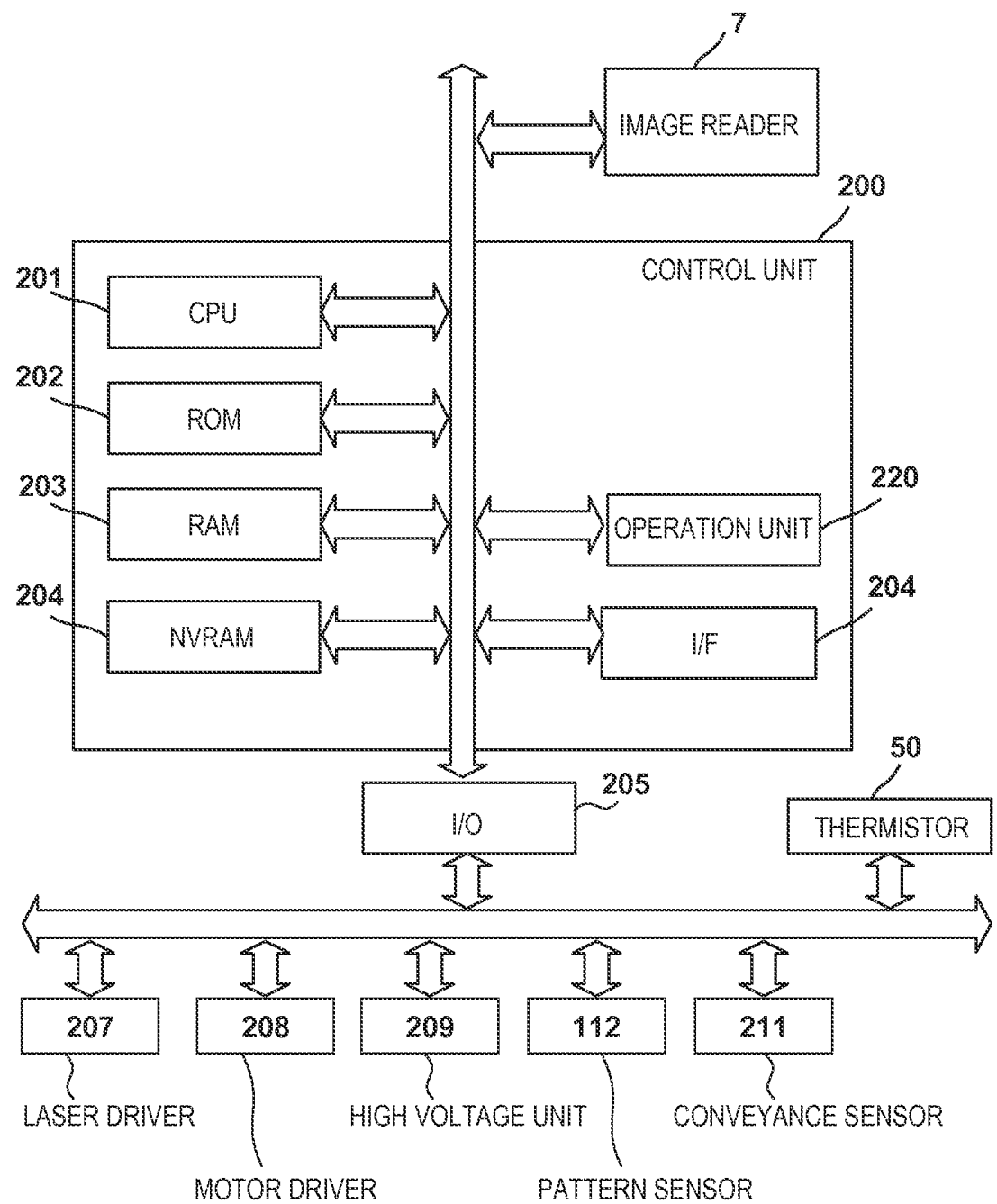
FIG. 2 is a block diagram showing a control system.

A control system of the image forming apparatus 100 will now be described with reference to FIG. 2. A CPU 201 is a unit that integrally controls units of the image forming apparatus 100. A ROM 202 is a storage apparatus that stores the substance of control to be performed by the CPU 201 as a program. A RAM 203 is a storage apparatus that is used as a working area necessary for the CPU 201 to control the image forming apparatus 100. The RAM 203 can also store image data generated by the image reader 7 reading a document, image data received by way of an external I/F 214, and the like. An NVRAM 204 is a non-volatile storage apparatus that stores data such as the number of sheets of paper on which images have been formed and total operating time periods of the respective process cartridges. The external I/F 214 is connected to a network compliant with communication protocols such as TCP/IP, and receives an instruction for performing a print job from a computer connected to the network. The external I/F 214 may transmit information of the image forming apparatus 100 to the computer. An I/O 205 is an input/output port for the CPU 201, and is connected to the thermistor 50, a laser driver 207, a motor driver 208, a high voltage unit 209, the pattern sensor 112, and a conveyance sensor 211. The laser driver 207 controls the laser scanners 104 in accordance with an image signal generated from image data. The motor driver 208 is a unit that drives rollers and the like. The photosensitive drums 102, the intermediate transfer belt 13a, conveyance rollers and the registration roller 115 provided to the conveyance path, paper feeding rollers provided to the first paper feeding cassette 113, the second paper feeding cassette 114 and the manual tray 116, and the like are driven by motors. The motor driver 208 controls rotations of these motors. The high voltage unit 209 controls voltage or current applied to the charge rollers 103 and the development sleeves 105 included in the process cartridges 101, the primary transfer roller 107, and the inner roller 110. The conveyance sensor 211 is a device that detects whether or not a sheet of paper S is present in the first paper feeding cassette 113, the second paper feeding cassette 114 and the manual tray 116, and detects the position of a sheet of paper S conveyed on the conveyance path. The pattern sensor 112 is one example of a measurement unit that measures, for a plurality of patterns in different colors formed by the printing unit 1 on the intermediate transfer belt 13a, intervals between a pattern in a reference color and patterns in colors other than the reference color.

(Operation Unit)

Figure 3A:
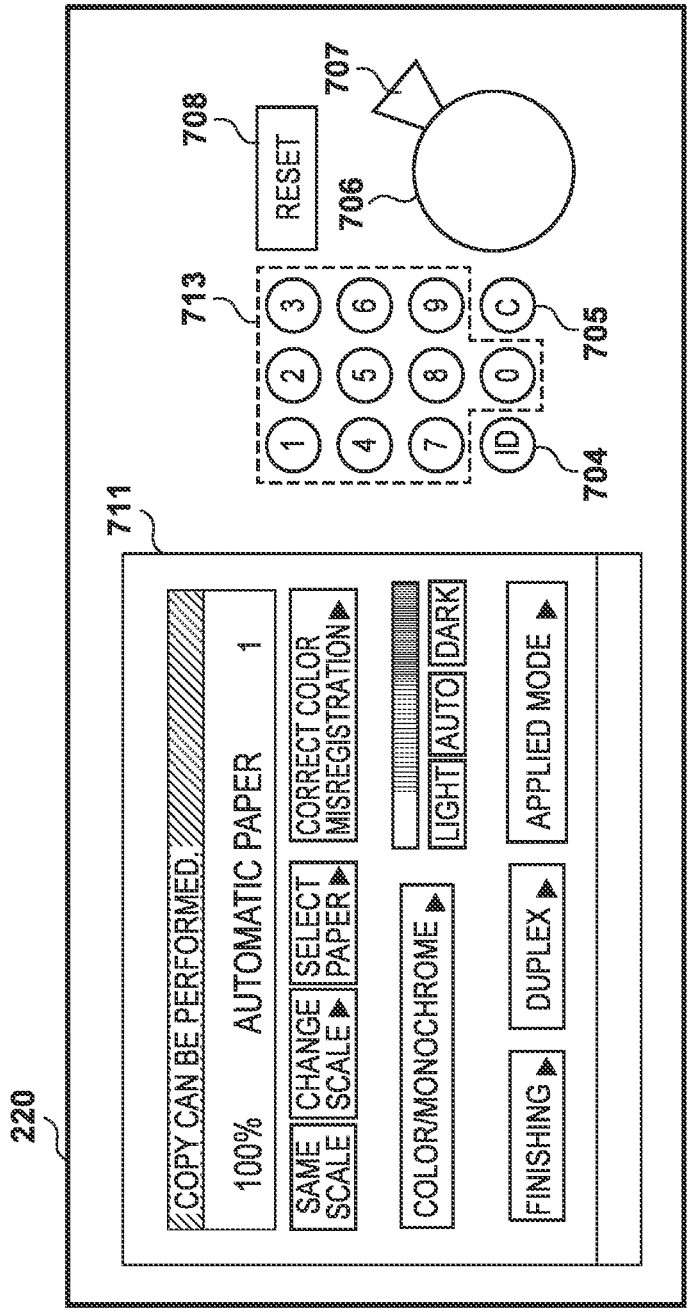
FIGS. 3A to 3C show a configuration of an operation unit.
Figure 3B:
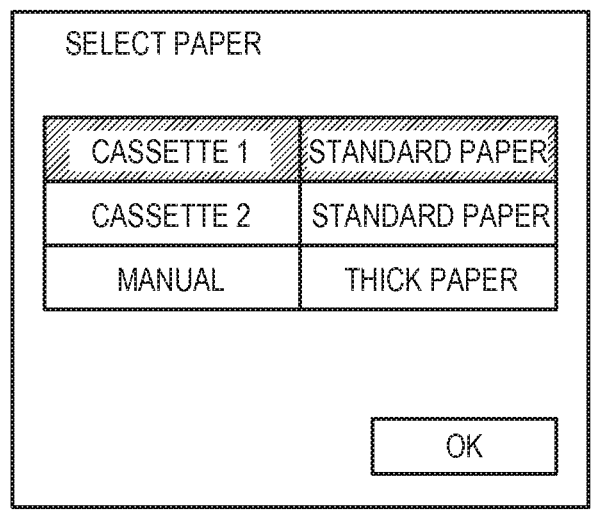
Figure 3C:
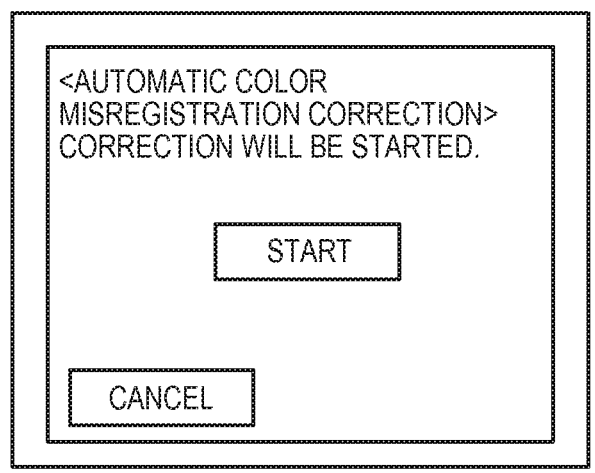

The operation unit 220 will now be described with reference to FIG. 3A. In the operation unit 220, a start key 706 is used to start an image forming operation. A stop key 707 is used to interrupt an image forming operation. Numeric keys 713 are used to input numerals. An ID key 704 is used to perform user authentication. A clear key 705 is used to clear input numerals and the like. A reset key 708 is used to initialize input settings. A display 711 is a display apparatus with a built-in touchscreen sensor, and displays software keys that can be operated by a user touching the same. When the user selects "select paper", which is a software key, the display 711 displays a paper selection screen shown in FIG. 3B. The user designates, via the paper selection screen, types of sheets (paper types) that are used in the first paper feeding cassette 113, the second paper feeding cassette 114 and the manual tray 116. The CPU 201 stores this information into the RAM 203, and controls image formation based on the same. For example, the CPU 201 selects an image forming mode (an image forming speed) corresponding to a paper type. As shown in FIG. 3C, the display 711 displays a start button for manual color misregistration correction. Basically, the number of sheets of paper on which images have been formed, a temperature change in the image forming apparatus, and the like serve as conditions (triggers) for the CPU 201 to start performing color misregistration correction; however, color misregistration correction may be performed also when pressing of the start button has been detected.

(Control of Image Formation)

The image forming operation controlled by the CPU 201 will now be described. The CPU 201 charges the surfaces of the photosensitive drums 102 uniformly at a predetermined polarity and potential by applying a predetermined voltage to the charge rollers 103 via the high voltage unit 209. The CPU 201 controls the laser scanners 104 by outputting, to the laser driver 207, an image signal generated by applying image processing to image data stored in the RAM 203. Consequently, electrostatic latent images are formed on the photosensitive drums 102 by laser beams output from the laser scanners 104. The CPU 201 feeds toner to the process cartridges 101 by controlling the toner reservoirs 106 via the motor driver 208. The CPU 201 also coats the development sleeves 105 with a developing agent by causing the development sleeves 105 to rotate via the motor driver 208. The development sleeves 105 develops the electrostatic latent images formed on the photosensitive drums 102 by causing toner to attach to the electrostatic latent images, thereby forming toner images. These toner images are transferred to the intermediate transfer belt 13a at primary transfer portions, which are points of contact between the photosensitive drums 102 and the intermediate transfer belt 13a, by a primary transfer bias applied by the high voltage unit 209 to the primary transfer rollers 107. The foregoing image forming operation is performed sequentially in each of the four process cartridges 101. A multi-color image is formed by transferring the toner images in different colors in multiple layers to the intermediate transfer belt 13a.

Meanwhile, the CPU 201 feeds a sheet of paper S and conveys the paper S along the paper conveyance path 20 by controlling the paper feeder 2 via the motor driver 208 in harmony with the image forming operation. The CPU 201 corrects skew of the paper S and aligns the position of the paper S with the position of the toner images on the intermediate transfer belt 13a by controlling the registration roller 115 via the motor driver 208. The paper S passes between the outer roller 21 and the inner roller 110 to which a secondary transfer bias is applied. Consequently, a multi-color toner image on the intermediate transfer belt 13a is transferred to the paper S. Thereafter, the paper S is sent to the fixing apparatus 3.

The CPU 201 applies heat and pressure to the paper S by controlling the fixing apparatus 3. Consequently, toner is fused, and a visible multi-color image is fixed onto the paper S. The CPU 201 discharges the paper S from the paper discharge path 40 to the stacker 5 by controlling the pair of paper discharge rollers 121 of the discharger 4 via the motor driver 208.

(Image Forming Speed)

During image formation, the photosensitive drums 102, the driving roller 13b and the fixing roller 117 rotate at the same speed (circumferential speed). This is because formation of a toner image, transfer to a sheet of paper S and fixing of the toner image compose a sequence of processes. A conveyance speed (moving speed) of the paper S during image formation is an image forming speed. Incidentally, a heat amount necessary for fixing the toner image differs depending on types of the paper S (material, thickness, etc.). For example, the larger the thickness of the paper S, the larger the necessary heat amount. By lowering the image forming speed, a time period in which the paper S with the transferred toner image is in contact with the fixing roller 117, that is to say, a time period in which heat is applied is extended. Consequently, a heat amount suited for the thickness of the paper S can be attained. In this way, the CPU 201 decides on an image forming speed in accordance with the type of the paper S.

It is assumed that the image forming apparatus 100 supports a first image forming speed, a second image forming speed, and a third image forming speed. Image forming speeds corresponding to the types of the paper S are shown in, for example, FIG. 4 (it is assumed here that the thickness is expressed as a basis weight). That is to say, the first image forming speed is 300 mm/s, the second image forming speed is 100 mm/s, and the third image forming speed is 150 mm/s. It is assumed that there are six types of paper S. According to FIG. 4, the first image forming speed is applied to standard papers 1 and 2, the second image forming speed is applied to thick papers 1, 2 and 3, and the third image forming speed is applied to a standard paper 3.

(Color Registration Adjustment)

The CPU 201 corrects color misregistrations in a sub scanning direction (a conveyance direction of the intermediate transfer belt 13a) by adjusting write start timings of images in colors (magenta, cyan and black) other than the reference color (yellow) through control of the laser driver 207. The CPU 201 can perform the correction using different color misregistration correction amounts at the first, second and third image forming speeds. As such, the CPU 201 functions as a correction unit that corrects color misregistrations by correcting write start timings of toner images in colors other than the reference color based on intervals between a pattern in the reference color and patterns in colors other than the reference color.

(Pattern Sensor)

Figure 5:
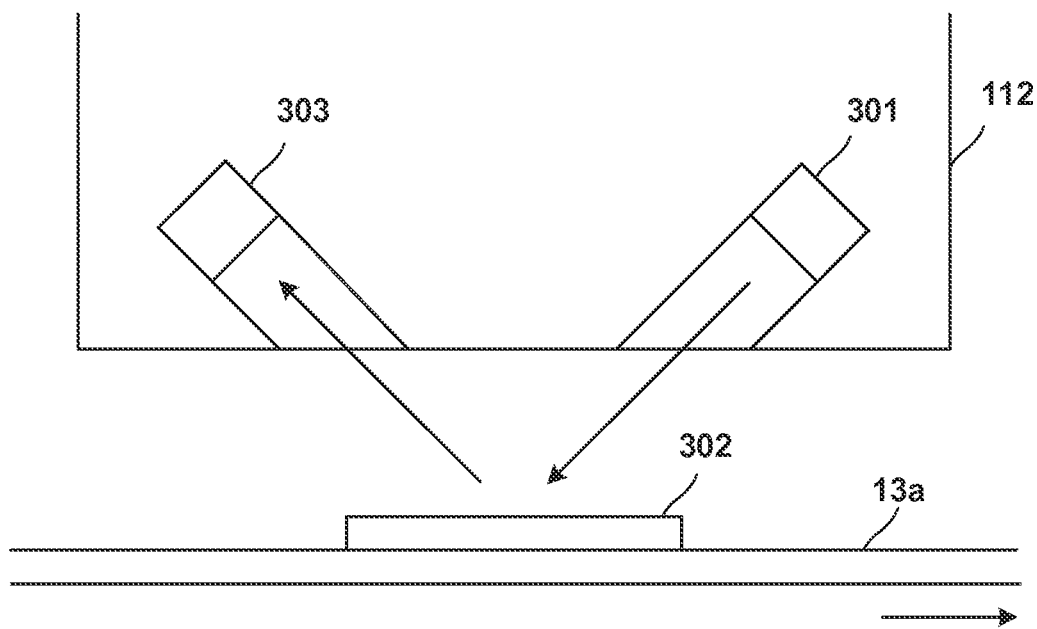
FIG. 5 shows a configuration of a pattern sensor.

The pattern sensor 112 will now be described with reference to FIG. 5. The pattern sensor 112 includes a light emitter 301 composed of an infrared LED and a photodetector 303 composed of a phototransistor. The light emitter 301 and the photodetector 303 are disposed at certain angles such that infrared light emitted by the light emitter 301 is reflected by the intermediate transfer belt 13a, and the reflected light is incident on the photodetector 303. It should be noted that the photodetector 303 may be arranged in a position where it can receive specular reflected light, and may be arranged in a position where it can receive scattered light. As reflective characteristics of a surface of the intermediate transfer belt 13a differ from reflective characteristics of patterns 302 that are formed with toner for detecting color misregistrations, the photodetector 303 receives different amounts of reflected light. The photodetector 303 converts received reflected light into an electrical signal (output signal) of amplitude corresponding to a light amount thereof. The voltage of the output signal from the photodetector 303 decreases as a light amount of reflected light decreases, and increases as a light amount of reflected light increases. In general, the larger a toner amount of a toner image formed on the intermediate transfer belt 13a, the smaller a light amount of reflected light. Therefore, the darkness of a created toner image decreases as the voltage of an output signal from the pattern sensor 112 increases, and the darkness of the toner image increases as the voltage (amplitude) of the output signal decreases. In this way, there is a correlation between the voltage of an output signal and the density of a toner image.

Figure 6:
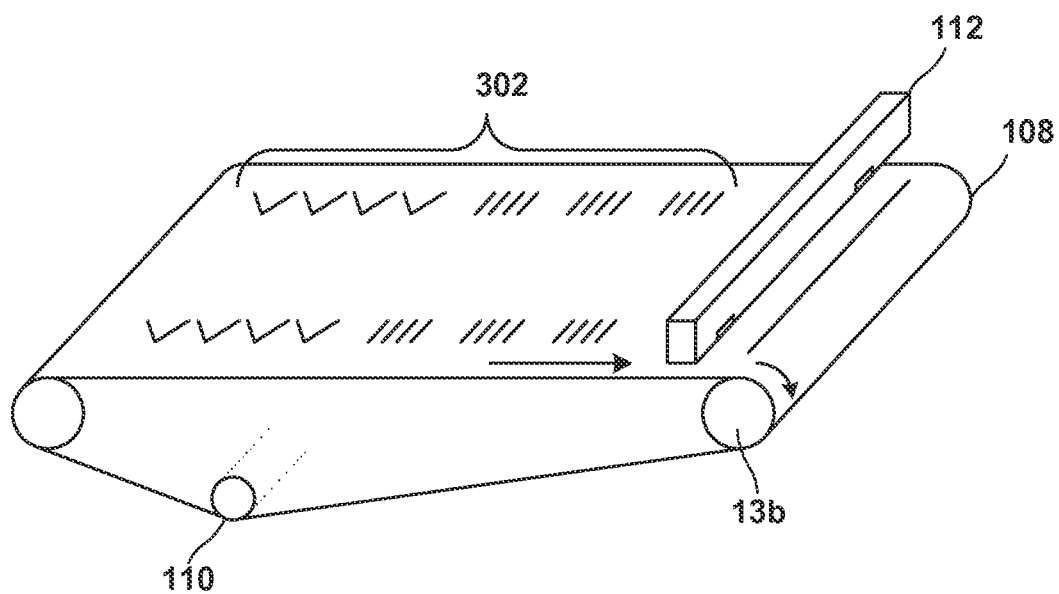
FIG. 6 shows a positional relationship among the pattern sensor, an intermediate transfer member, and patterns.

The pattern sensor 112, the intermediate transfer belt 13a and the patterns 302 are arranged as shown in FIG. 6. The pattern sensor 112 consecutively reads the plurality of patterns 302 formed along a rotation direction of the intermediate transfer belt 13a (the sub scanning direction). As shown in FIG. 6, a four-line pattern can be composed of one line in the reference color and three lines in colors other than the reference color. It should be noted that a pattern of "<" can be used also in color misregistration and scale corrections in the main scanning direction. In a case where color misregistration and scale corrections in the main scanning direction are not performed, the pattern of "<" can be omitted.

(Detection of Color Misregistration Amounts)

Figure 7:
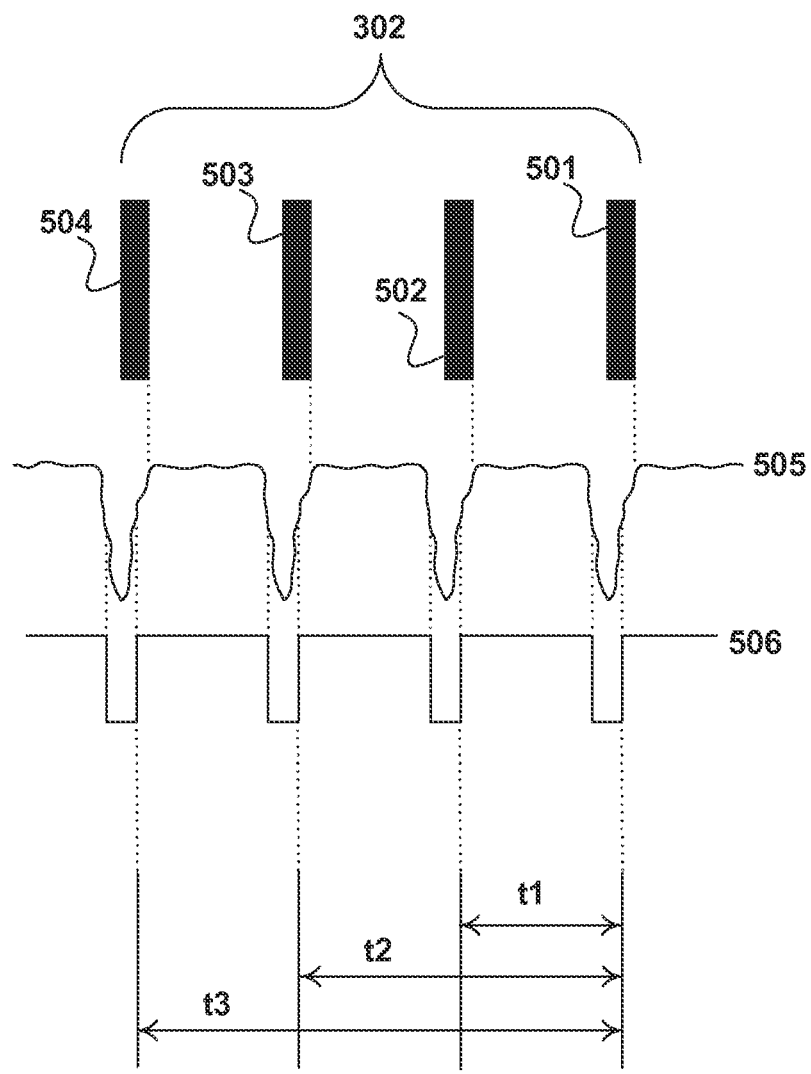
FIG. 7 shows processing for detecting color misregistration correction patterns formed in the image forming apparatus.

Detection of color misregistration amounts in the sub scanning direction will now be described with reference to FIG. 7. In order to detect the color misregistration amounts, the printing unit 1 forms the patterns 302 on the intermediate transfer belt 13a as shown in FIG. 6. FIG. 7 schematically shows a part of the patterns 302. A yellow pattern 501 is created by yellow toner. A magenta pattern 502 is created by magenta toner. A cyan pattern 503 is created by cyan toner. A black pattern 504 is created by black toner. An interval between neighboring patterns is, for example, 12700 μm (equivalent to 300 pixels at 600 dpi). The pattern sensor 112 detects the patterns 501 to 504 formed on the intermediate transfer belt 13a, and generates an analog signal 505. The pattern sensor 112 converts the analog signal 505 output from the photodetector 303 into a detected waveform 506 by binarizing the same using a comparator. The comparator performs binarization by comparing a threshold voltage with the analog signal 505. The threshold voltage is preset so as to determine whether or not a pattern formed with toner is present on the intermediate transfer belt 13a.

The CPU 201 activates a timer counter provided internally to the CPU 201 so as to read the detected waveform 506 output from the pattern sensor 112. The timer counter is a counter that performs successive accumulation with a built-in clock of the CPU 201. The CPU 201 detects a falling edge of the detected waveform 506 via the I/O 205, converts a timer counter value at the time of the detection into time, and stores the time into the RAM 203. The CPU 201 considers a detection timing of the pattern 501 as a reference, and obtains distances between the colors by obtaining differences t1 to t3 between the reference and detection timings of the patterns 502 to 504 and multiplying the differences t1 to t3 by the conveyance speed. It should be noted that timings may be adjusted using only the differences t1 to t3 without obtaining physical distances. As stated earlier, while the patterns 501 to 504 are arranged at an equal interval in image data, they will no longer be arranged at an equal interval if color misregistration occurs. Without any color misregistrations, $t1=t0$, $t2=2 \times t0$, and $t3=3 \times t0$. Therefore, color misregistration amounts are as follows: $\Delta t1=t0-t1$, $\Delta t2=2 \cdot t0-t2$, and $\Delta t3=3 \cdot t0-t3$ (where $t0=12700$ μm/image forming speed). Such color misregistrations depend on a temperature change and component deterioration in the laser scanners 104, the process cartridges 101, and the intermediate transfer belt 13a. The CPU 201 can detect color misregistration amounts at any image forming speed.

FIG. 8A shows one example of the result of detection of color misregistration amounts at the first image forming speed. A distance L1 between yellow and magenta is 12700 μm. A distance L2 between yellow and cyan is 25400 μm. An ideal distance L3 between yellow and black is 38100 μm. At the first image forming speed (300 mm/s), the ideal reading time t1 ($=t0$) in the pattern sensor 112 is 42333 μs. An ideal t2 ($=2 \cdot t0$) is 847667 μs. An ideal t3 ($=3 \cdot t0$) is 127000 μs. Here, assume that the times t1, t2 and t3 detected by the pattern sensor 112 are 42328 μs, 84711 μs and 126973 μs, respectively. In this case, differences $\Delta t1$, $\Delta t2$ and $\Delta t3$ from the ideal times are −5 μs, 44 μs and −27 μs, respectively. Converting these differences into distances at the first image forming speed (300 mm/s) yields $\Delta L1$ of −2 μm, $\Delta L2$ of +13 μm, and $\Delta L3$ of −8 μm. On the other hand, FIG. 8B shows one example of the result of detection of color misregistration amounts at the second image forming speed. Similarly to the example of FIG. 8A, the example of FIG. 8B shows calculation of color misregistration amounts, wherein $\Delta L1=+55$ μm, $\Delta L2=+110$ μm, and $\Delta L3=+154$ μm. FIG. 8C shows one example of the result of detection of color misregistration amounts at the third image forming speed. Similarly to the example of FIG. 8A, the example of FIG. 8C shows calculation of color misregistration amounts, wherein $\Delta L1=-8$ μm, $\Delta L2=+18$ μm, and $\Delta L3=-10$ μm.

In a case where images are formed at the first image forming speed, the CPU 201 shifts the write start timings of M, C and K images from the ideal timings so as to cancel out the color misregistration amounts detected at the first image forming speed shown in FIG. 8A. In a case where images are formed at the second image forming speed, the CPU 201 shifts the write start timings of M, C and K images from the ideal timings so as to cancel out the color misregistration amounts detected at the second image forming speed shown in FIG. 8B. In a case where images are formed at the third image forming speed, the CPU 201 shifts the write start timings of M, C and K images so as to cancel out the color misregistration amounts detected at the third image forming speed shown in FIG. 8C. Consequently, color misregistrations in the sub scanning direction are corrected.

In the above-described example, color misregistration amounts are detected individually at each of the first, second and third image forming speeds. Meanwhile, color misregistration amounts at a certain image forming speed and color misregistration amounts at another image forming speed may be correlated or analogous. In this case, by obtaining color misregistration amounts at one image forming speed and correcting the obtained color misregistration amounts based on the correlation, detection of color misregistration amounts at another image forming speed could be omitted. For example, once the differences between the color misregistration amounts at one image forming speed and the color misregistration amounts at another image forming speed have been obtained, the color misregistration amounts at another image forming speed can be obtained by adding the differences to the result of detection of the color misregistration amounts at one image forming speed. If the differences between the color misregistration amounts at one image forming speed and the color misregistration amounts at another image forming speed are extremely small, detection of the color misregistration amounts at another image forming speed could be omitted.

FIG. 9A shows differences between the results of detection of the color misregistration amounts at the first and second image forming speeds shown in FIGS. 8A and 8B. In a case where images are formed at the second image forming speed, the write start timings of M, C and K images are shifted from the ideal timings so as to cancel out the differences between the color misregistration amounts detected at the first image forming speed shown in FIG. 8B and the color misregistration amounts shown in FIG. 9A. FIG. 9B shows differences between the results of detection of the color misregistration amounts at the first and third image forming speeds shown in FIGS. 8A and 8C. Referring to FIG. 9B, there is little difference between the color misregistration amounts at the first image forming speed and the color misregistration amounts at the third image forming speed. Therefore, the CPU 201 may omit detection of the color misregistration amounts at the third image forming speed, and shift the write start timings of M, C and K images at the third image forming speed so as to cancel out color misregistrations at the third image forming speed using the color misregistration amounts detected at the first image forming speed.

(Overview of Image Forming Operation)

Figure 10:
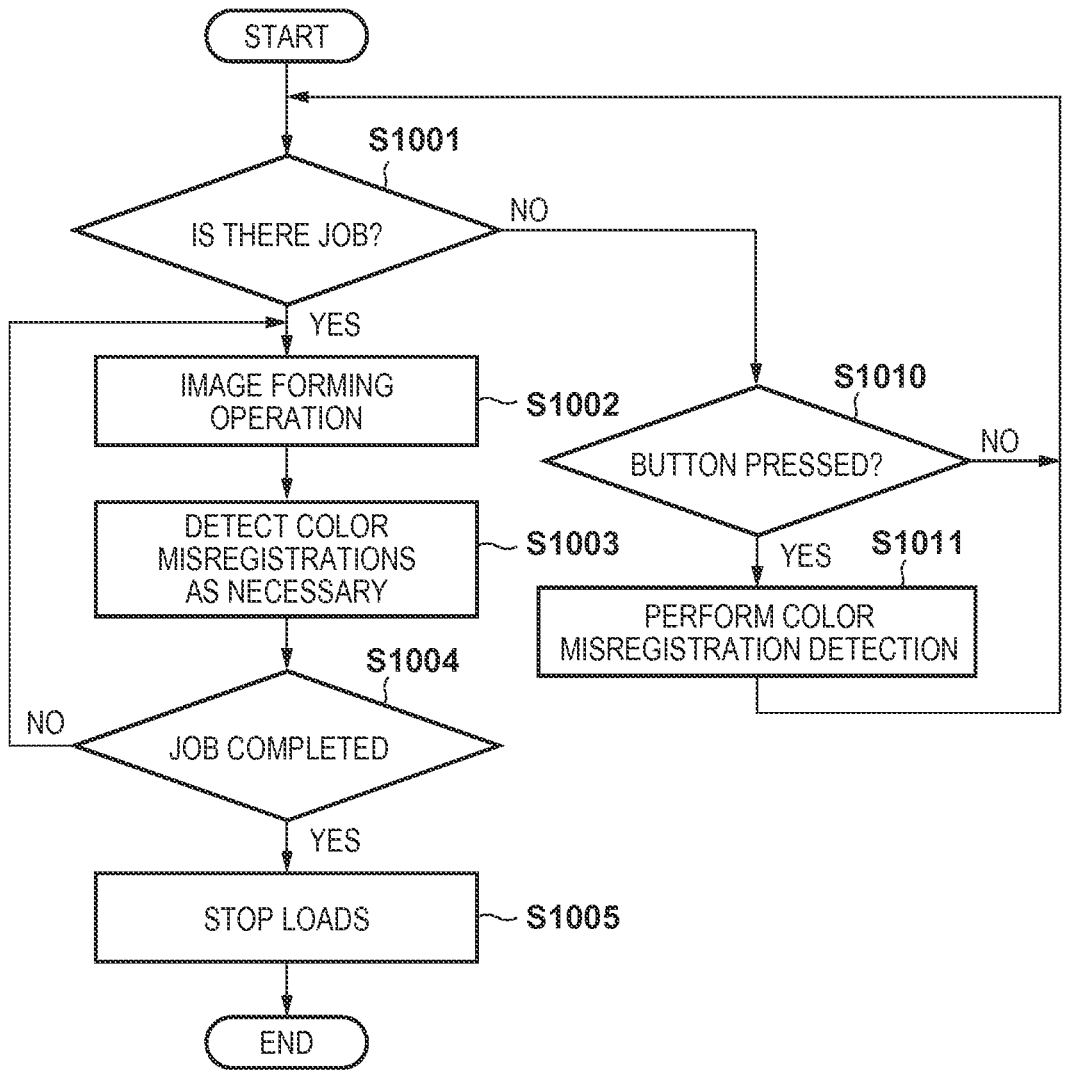
FIG. 10 is a flowchart showing one example of an overall image forming operation.

The CPU 201 performs the image forming operation in accordance with a flowchart shown in FIG. 10. In step S1001, the CPU 201 determines whether or not an instruction for performing a print job has been received from the operation unit 220 or a host computer. If the instruction for performing the print job has not been received, processing proceeds to step S1010. In step S1010, the CPU 201 determines whether or not a button on the operation unit 220 for issuing an instruction for color misregistration correction has been pressed. If the start button for color misregistration correction, which has been described with reference to FIGS. 3A and 3C, has not been pressed, the CPU 201 returns to step S1001. If the start button has been pressed, the CPU 201 proceeds to step S1011. In step S1011, the CPU 201 performs color misregistration detection. Consequently, color misregistration correction is performed at a timing desired by an operator. On the other hand, if the instruction for performing the print job has been received in step S1001, the CPU 201 proceeds to step S1002.

Figure 11A:
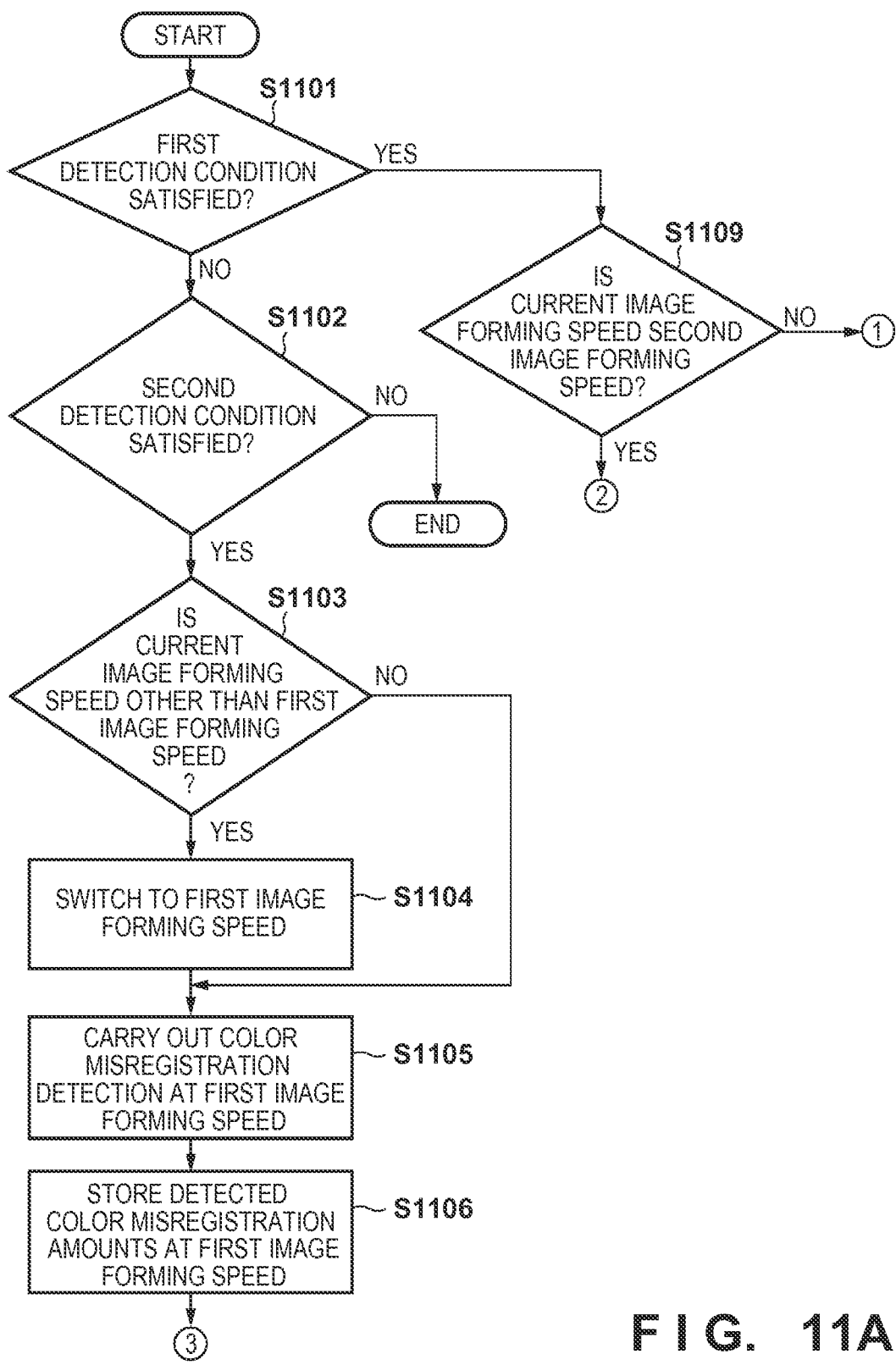
FIGS. 11A to 11C are flowcharts showing one example of color misregistration detection.
Figure 11B:
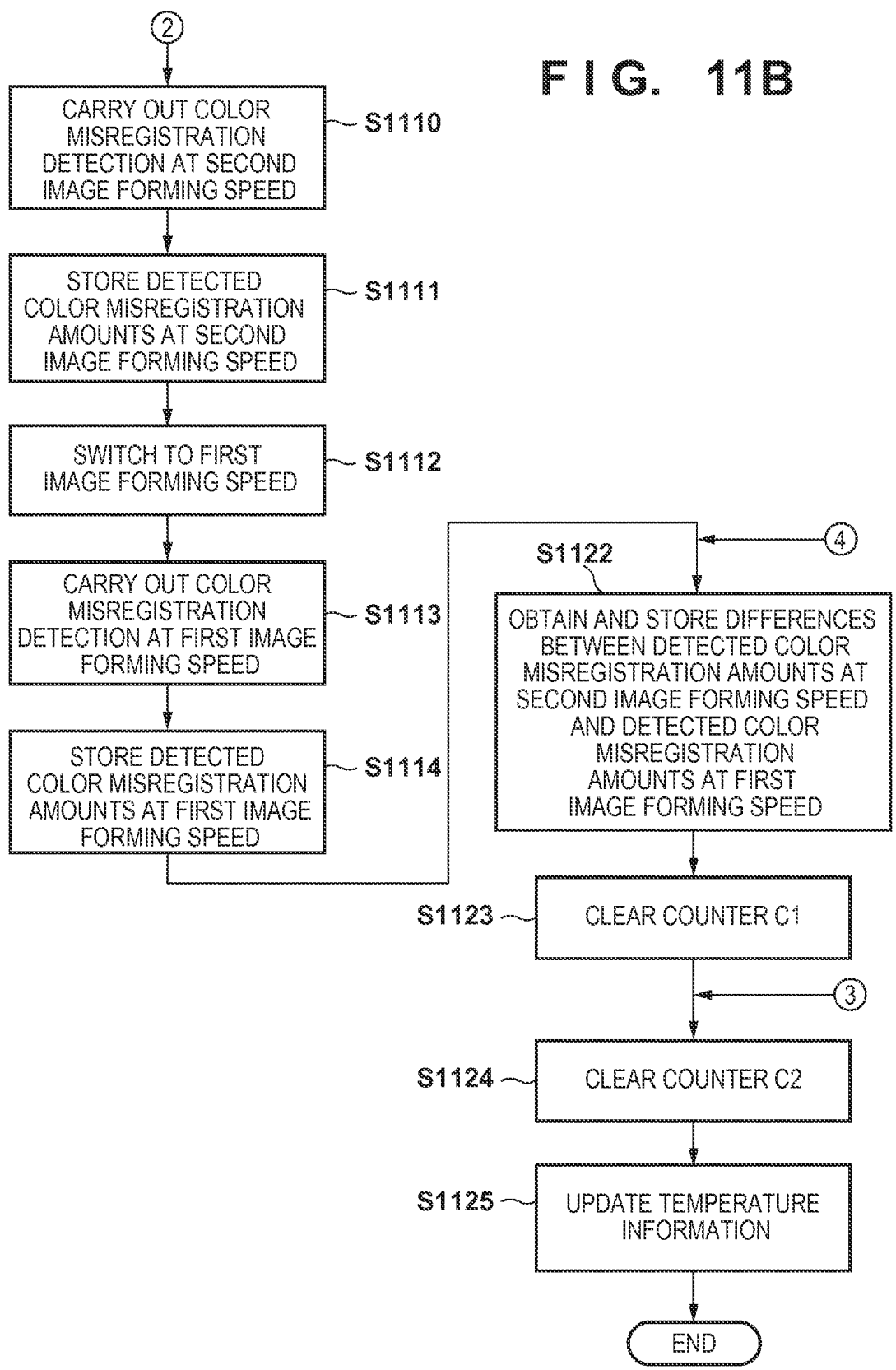
Figure 11C:
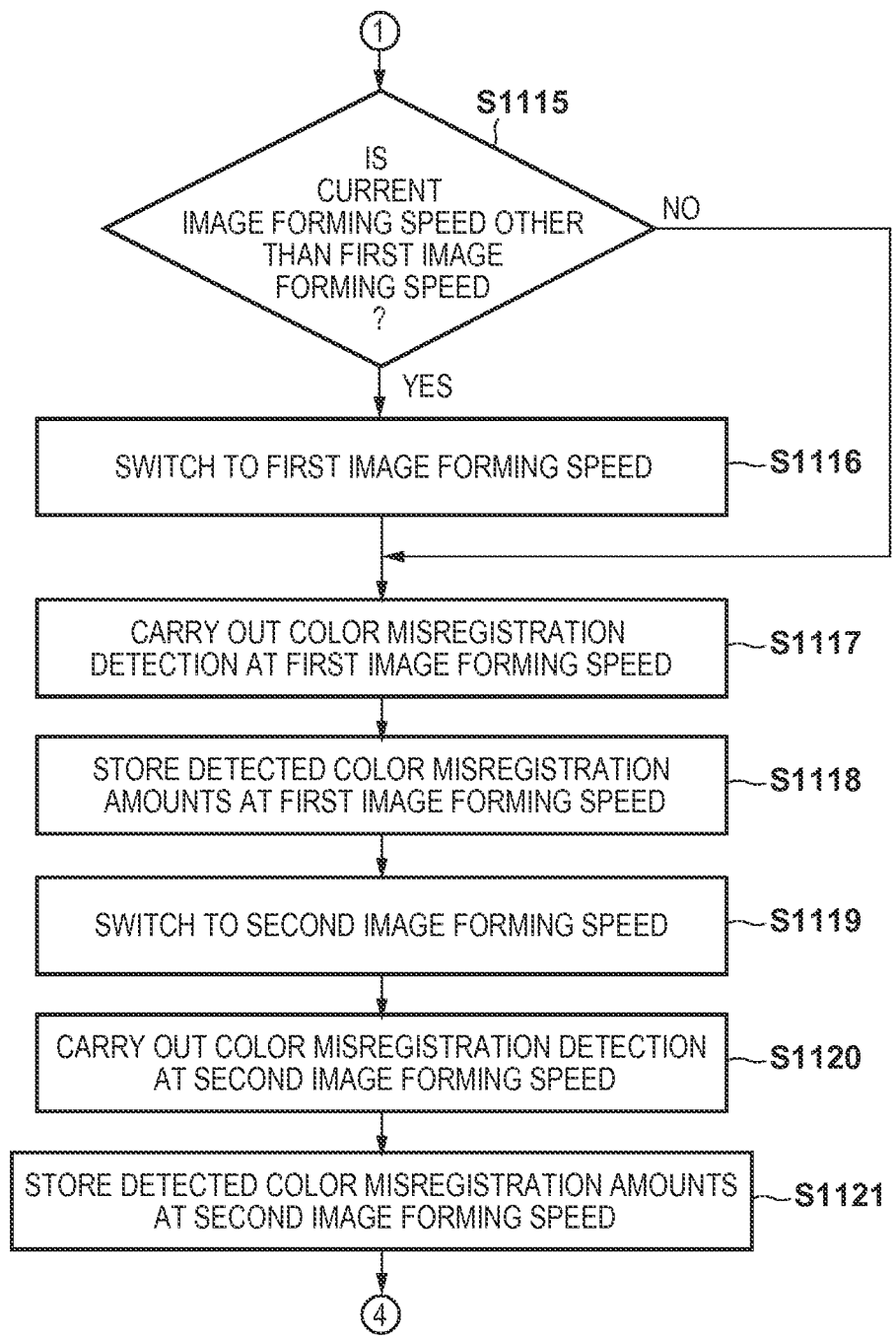
Figure 12A:
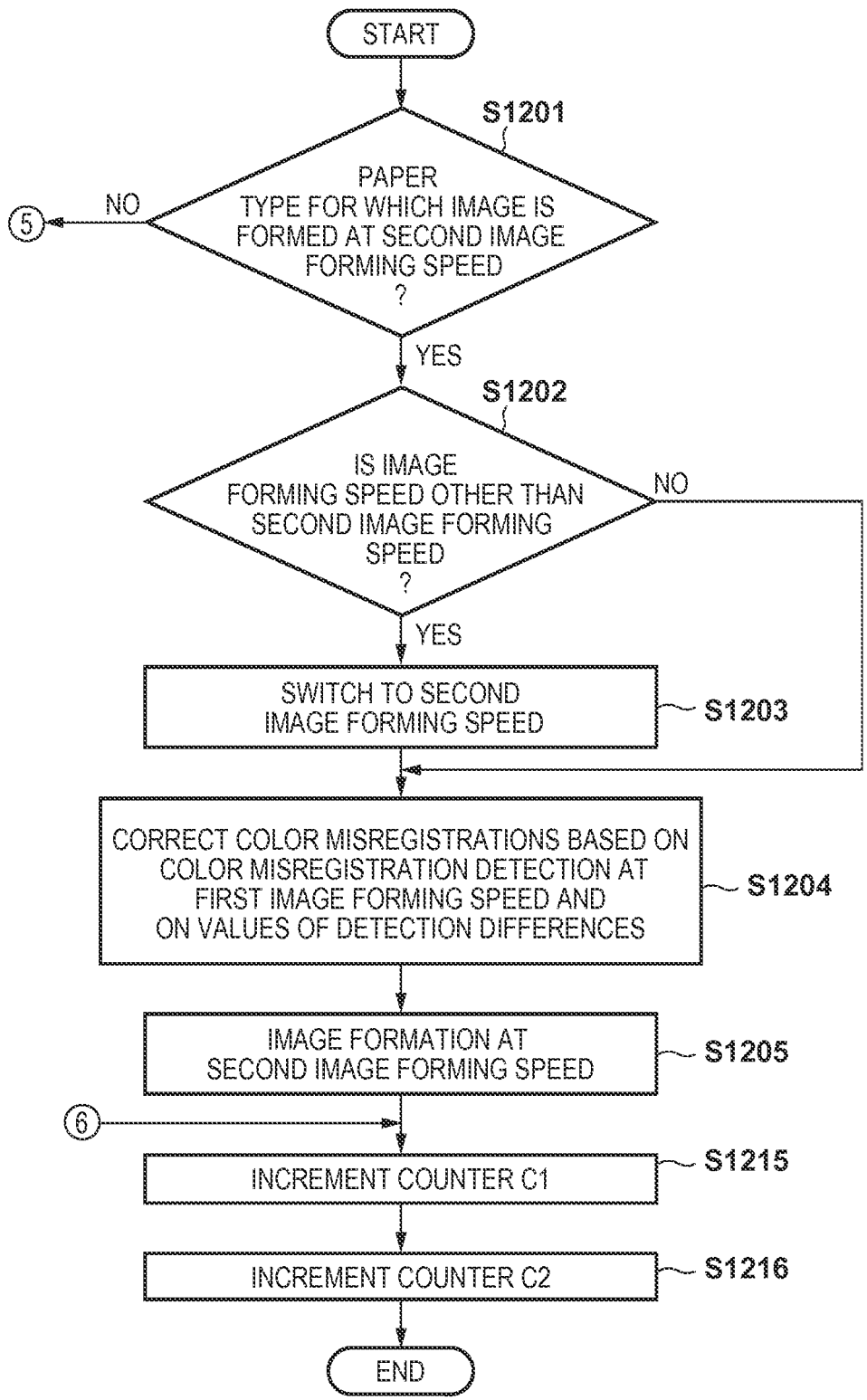
FIGS. 12A and 12B are flowcharts showing one example of color misregistration correction.
Figure 12B:
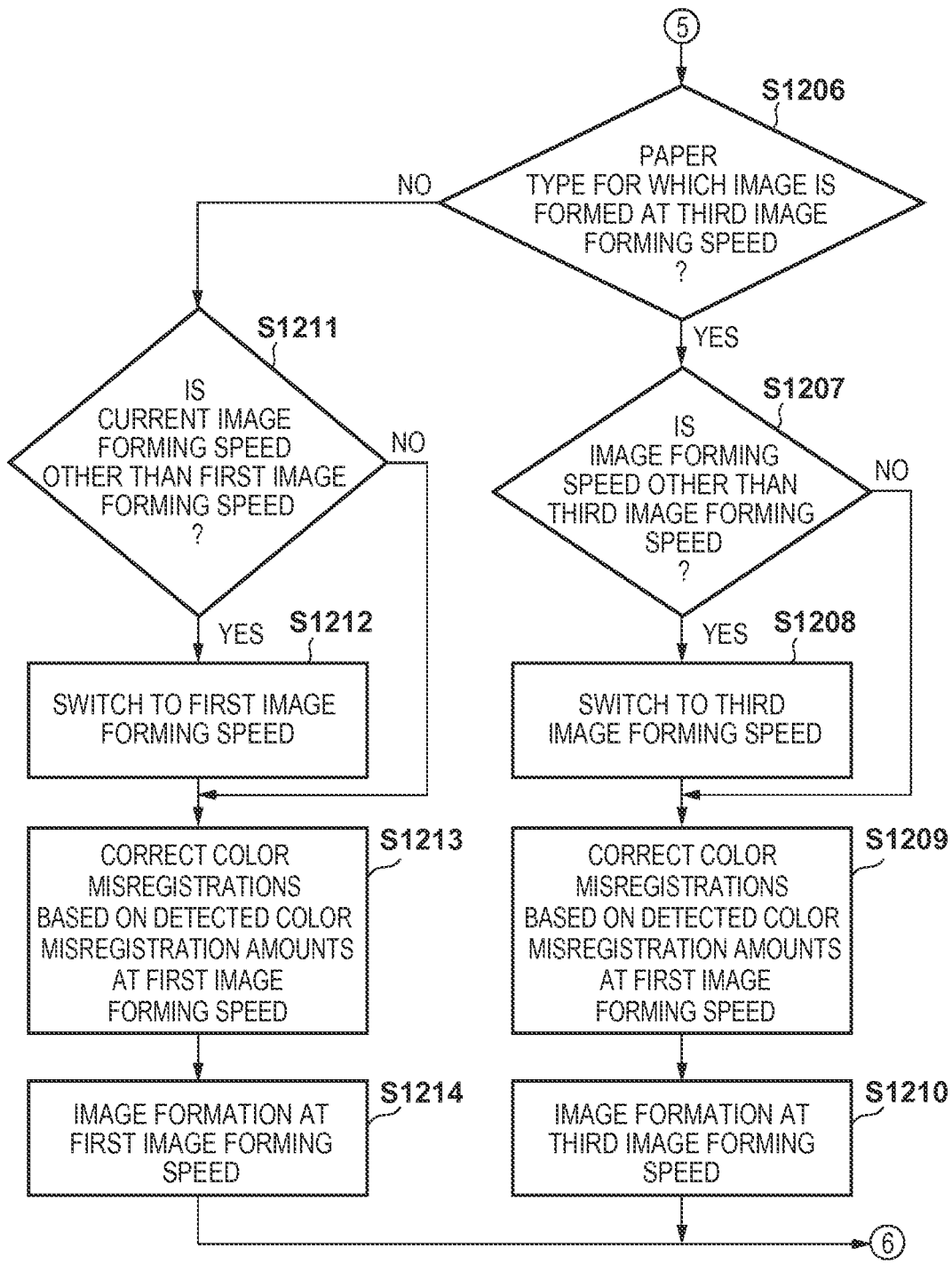
Figure 13A:
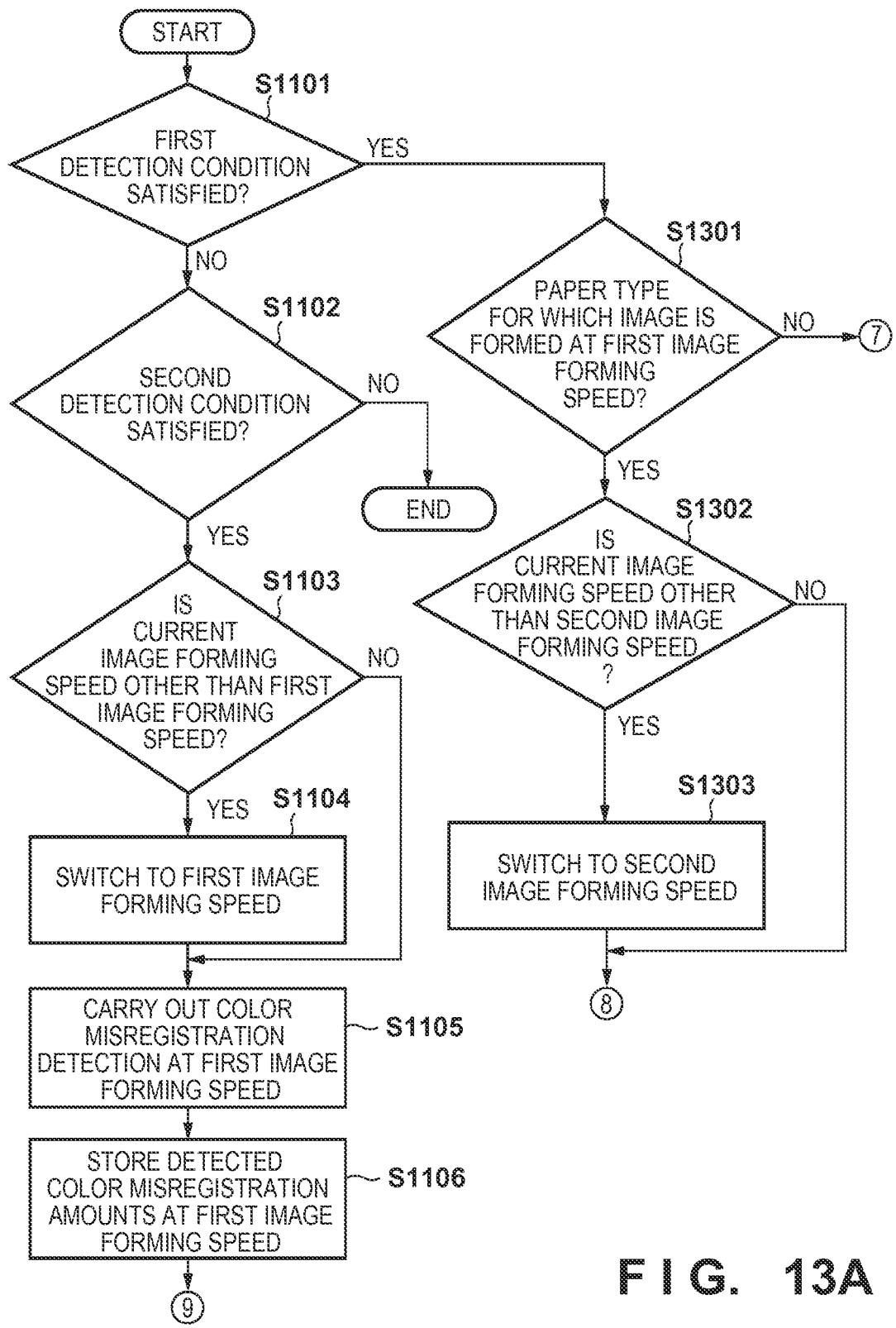
FIGS. 13A to 13C are flowcharts showing one example of color misregistration detection.
Figure 13B:
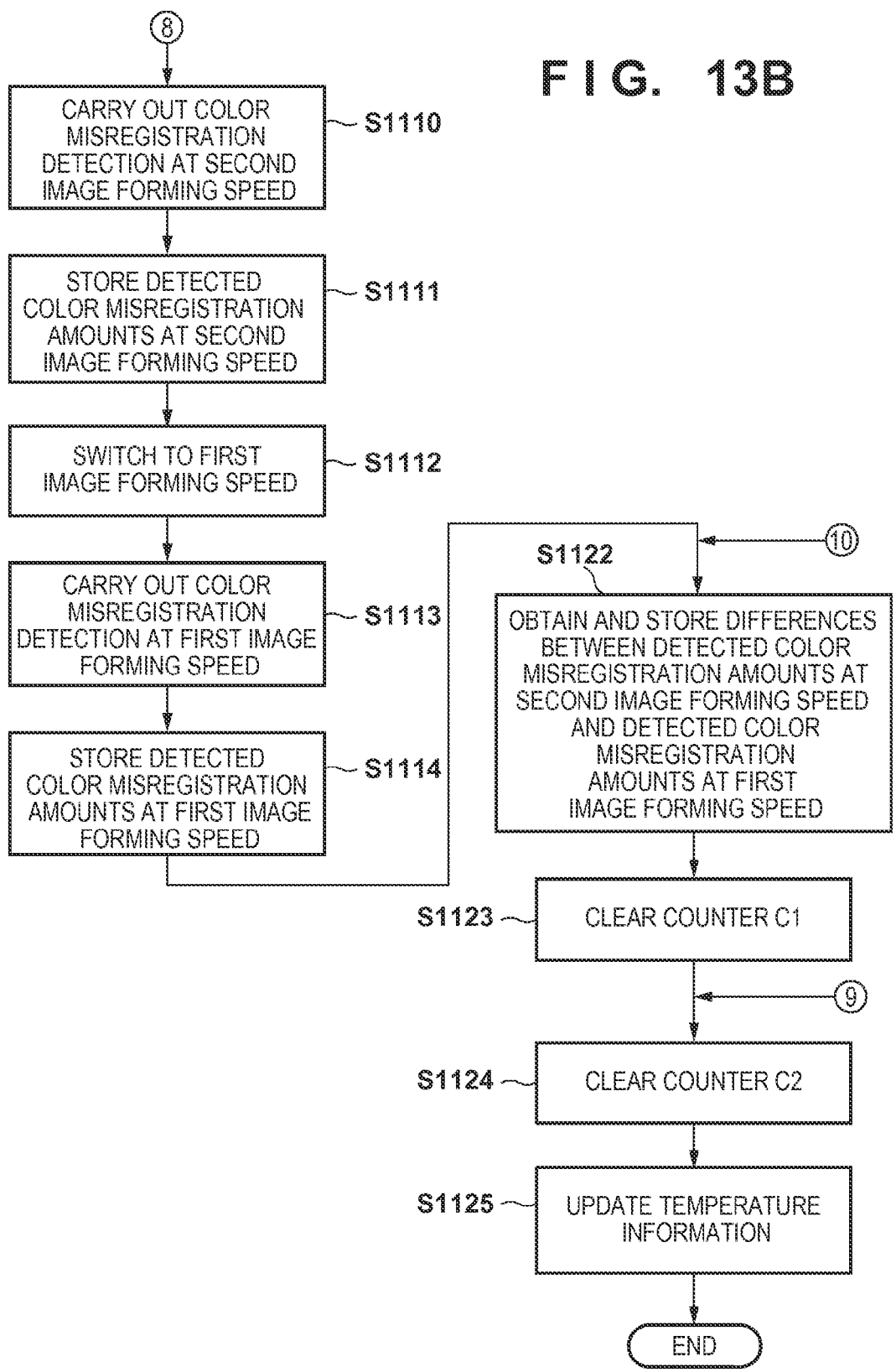
Figure 13C:
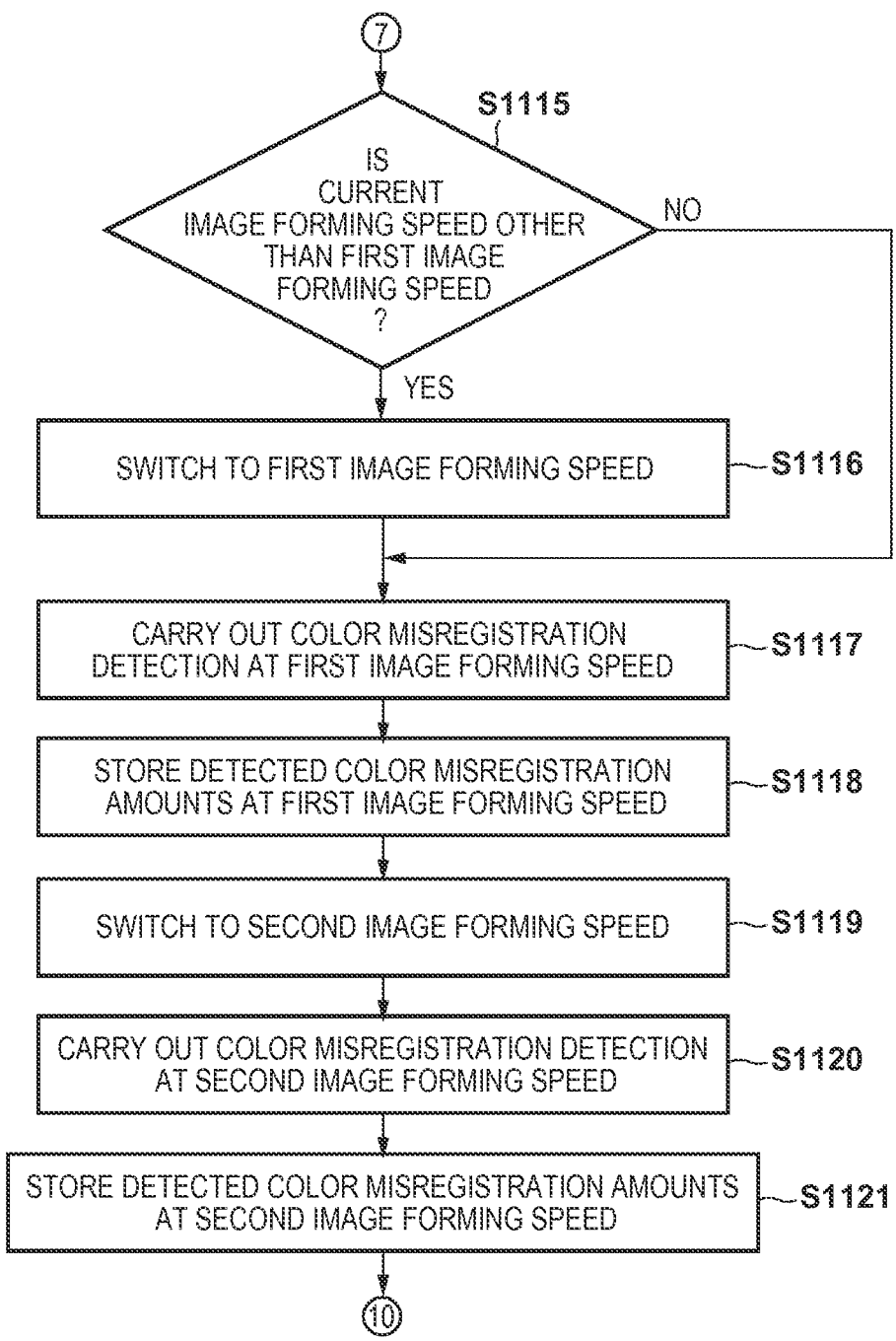

In step S1002, the CPU 201 performs the image forming operation in accordance with, for example, a flowchart shown in FIGS. 12A and 12B. In step S1003, the CPU 201 performs control after image formation is ended in accordance with, for example, a flowchart shown in FIGS. 11A-11C. Step S1003 may be performed prior to step S1002, in which case processing of a flowchart shown in FIGS. 13A-13C is performed in step S1003. In step S1004, the CPU 201 determines whether or not the print job has been completed. For example, in the case of a job for forming images on 10 sheets of paper, the CPU 201 determines whether or not image formation has been completed for all of the images on 10 sheets of paper. If the image formation has not been completed, the CPU 201 returns to S1002; if the image formation has been completed, the CPU 201 proceeds to step S1005. In step S1005, the CPU 201 stops all loads (a fixer, rollers, etc.) involved in the image formation so as to make a transition to a standby mode.

(Flow of Judgment about Necessity of Detection of Color Misregistration Amounts, and Control of Detection of Color Misregistration Amounts)

The CPU 201 determines whether to perform both or only one of the following: color misregistration detection at the highest first image forming speed, and color misregistration detection at the lowest second image forming speed. As a higher image forming speed allows for color misregistration detection in a shorter time period, the CPU 201 increases the frequency of color misregistration detection at the highest first image forming speed. In this way, the CPU 201 can efficiently correct color misregistrations attributed to short-term causes at any image forming speed. On the other hand, with regard to color misregistrations attributed to long-term causes, a specific correlation among a plurality of image forming speeds may change, and therefore the CPU 201 needs to update the above-described differences. The CPU 201 also needs to perform color misregistration detection at the lowest second image forming speed with low frequency. It should be noted that, as the color misregistration amounts at the third image forming speed are analogous to the color misregistration amounts at the first image forming speed, it is assumed in the following description that color misregistration detection at the third image forming speed is always omitted.

In view of the above, in the present embodiment, two color misregistration detection conditions are set. A first detection condition is a condition for performing both of the color misregistration detection at the first image forming speed and the color misregistration detection at the second image forming speed. A second detection condition is a condition for performing the color misregistration detection at the first image forming speed and omitting the color misregistration detection at the second image forming speed. Here, the CPU 201 makes a judgment about the necessity of color misregistration detection in accordance with the flowchart shown in FIGS. 11A-11C each time image formation on one sheet of paper is ended. A first counter C1 and a second counter C2 are provided in the NVRAM 204. These counters function as a first count unit and a second count unit that count the number of sheets of paper on which images have been formed. The first detection condition is that the first counter C1 exceeds a threshold Th1. The second detection condition is that the second counter C2 exceeds a threshold Th2, or that a difference between the temperature that was measured when previous color misregistration detection was performed and the current measured temperature is equal to or larger than a threshold temperature Th3. The counters C1 and C2 each count the number of sheets of paper on which images have been formed. The threshold Th1 is, for example, 10000 sheets of paper, and the threshold Th2 is, for example, 300 sheets of paper. The threshold temperature Th3 is, for example, 3° C. Timings for incrementing and clearing these counters will be described later.

In step S1101, the CPU 201 determines whether or not the first detection condition is satisfied. For example, the CPU 201 determines that the first detection condition is satisfied if the first counter C1 exceeds Th1. If the first detection condition is satisfied, there is a possibility that the differences between the color misregistration amounts at the first image forming speed and the color misregistration amounts at the second image forming speed are large. That is to say, the CPU 201 proceeds to step S1109 to carry out color misregistration detection at both of the first and second image forming speeds.

In step S1109, the CPU 201 determines whether or not the current image forming speed set in the printing unit 1 is the second image forming speed. The flowchart shown in FIGS. 11A-11C is performed while a print job is being performed. That is to say, when step S1109 is performed, the printing unit 1 is rotating the intermediate transfer belt 13a and the like at one of the image forming speeds. Therefore, if the current image forming speed is the second image forming speed, an overall processing time period can be shortened by starting the color misregistration detection at the second image forming speed. This allows for omission of a time period for switching among image forming speeds. If the current image forming speed is the second image forming speed, the CPU 201 proceeds to step S1110.

In step S1110, the CPU 201 carries out the color misregistration detection with the second image forming speed maintained. In step S1111, the CPU 201 stores color misregistration amounts at the second image forming speed into the RAM 203. In step S1112, the CPU 201 instructs the motor driver 208 and the like to switch to the first image forming speed. The motor driver 208 adjusts a motor rotation frequency so as to accomplish the first image forming speed. In step S1113, the CPU 201 carries out the color misregistration detection at the first image forming speed. In step S1114, the CPU 201 stores color misregistration amounts at the first image forming speed into the RAM 203.

On the other hand, if the CPU 201 determines in step S1109 that the current image forming speed is not the second image forming speed, the CPU 201 proceeds to step S1115. In step S1115, the CPU 201 determines whether or not the current image forming speed is other than the first image forming speed. If the current image forming speed is the first image forming speed, the CPU 201 skips step S1116 and proceeds to step S1117. On the other hand, if the current image forming speed is other than the first image forming speed, the CPU 201 proceeds to step S1116. In step S1116, the CPU 201 switches to the first image forming speed. In step S1117, the CPU 201 carries out the color misregistration detection at the first image forming speed. In step S1118, the CPU 201 stores color misregistration amounts at the first image forming speed into the RAM 203. In step S1119, the CPU 201 switches to the second image forming speed. In step S1120, the CPU 201 carries out the color misregistration detection at the second image forming speed. In step S1121, the CPU 201 stores color misregistration amounts at the second image forming speed into the RAM 203.

In the course of the above steps, both of the color misregistration amounts at the first image forming speed and the color misregistration amounts at the second image forming speed are retained in the RAM 203. Then, in step S1122, the CPU 201 obtains differences dL1 to dL3 at the second image forming speed by subtracting the color misregistration amounts ΔL1 to ΔL3 at the first image forming speed from the color misregistration amounts ΔL1 to ΔL3 at the second image forming speed, and stores the differences into the RAM 203. The color misregistration amounts ΔL1 to ΔL3 are color misregistration correction values for the first image forming speed, whereas ΔL1+dL1, ΔL2+dL2, and ΔL3+dL3 are used as color misregistration correction values for the second image forming speed. In step S1123, the CPU 201 clears the counter C1. In step S1124, the CPU 201 clears the counter C2. In step S1125, the CPU 201 updates temperature information X at the time of carrying out the color misregistration detection, which is retained in the RAM 203, to the current temperature Xc detected by the thermistor 50.

On the other hand, if the CPU 201 determines in step S1101 that the first detection condition is not satisfied, the CPU 201 proceeds to step S1102. In step S1102, the CPU 201 determines whether or not the second detection condition is satisfied. For example, the CPU 201 determines whether or not the counter C2 exceeds the threshold Th2 (Th1>>Th2). The CPU 201 also determines whether or not a difference between the current temperature Xc obtained by the thermistor 50 and a temperature X stored in the RAM 203 is equal to or larger than the threshold Th3. If the second detection condition is satisfied, the CPU 201 proceeds to step S1103 so as to detect color misregistrations caused by a temperature change in the image forming apparatus 100. If the second detection condition is not satisfied, the CPU 201 ends processing of the present flowchart. In step S1103, the CPU 201 determines whether or not the current image forming speed is other than the first image forming speed. The CPU 201 skips step S1104 and proceeds to step S1105 if the current image forming speed is the first image forming speed, and proceeds to step S1104 if the current image forming speed is other than the first image forming speed. In step S1104, the CPU 201 switches to the first image forming speed in the printing unit 1. In step S1105, the CPU 201 carries out the color misregistration detection at the first image forming speed. In step S1106, the CPU 201 stores color misregistration amounts at the first image forming speed into the RAM 203. Thereafter, the CPU 201 performs steps S1124 and S1125. It should be noted that the values of the thresholds Th1, Th2 and Th3 are examples, and it is assumed that they are preset in accordance with the type of the image forming apparatus.

(Paper-by-Paper Image Forming Operation Including Color Misregistration Correction)

The CPU 201 performs the image forming operation while correcting color misregistrations on a paper-by-paper basis in accordance with the flowchart shown in FIGS. 12A and 12B. In step S1201, the CPU 201 determines whether or not the paper type of a sheet of paper S targeted for image formation is a paper type for which an image is formed at the second image forming speed. The CPU 201 retains, in the ROM 202, a table indicating correspondence between paper types and image forming speeds shown in FIG. 4. Therefore, the CPU 201 obtains an image forming speed by searching the table based on a paper type designated in a print job. If the paper type of the paper S is a paper type for which an image is formed at the second image forming speed, processing proceeds to step S1202. In step S1202, the CPU 201 determines whether or not the current image forming speed set in the printing unit 1 is other than the second image forming speed. If the current image forming speed is the second image forming speed, processing skips step S1203 and proceeds to step S1204. If the current image forming speed is other than the second image forming speed, the CPU 201 proceeds to step S1203. In step S1203, the CPU 201 switches to the second image forming speed in the printing unit 1. In step S1204, the CPU 201 corrects color misregistrations based on the color misregistration amounts ΔL1 to ΔL3 at the first image forming speed and on the differences dL1 to dL3. For example, the CPU 201 calculates a correction amount of a timing for magenta at the second image forming speed by adding the difference dL1 to ΔL1. A similar arithmetic expression can be adopted for other colors. The CPU 201 shifts the write start timings of images by correction amounts. In step S1205, the CPU 201 performs the image forming operation at the second image forming speed by controlling the printing unit 1.

On the other hand, if the type of the paper S is not a paper type for which an image is formed at the second image forming speed in step S1201, the CPU 201 proceeds to step S1206. In step S1206, the CPU 201 determines whether or not the paper S targeted for image formation is of a paper type for which an image is formed at the third image forming speed. If the paper S is of a paper type for which an image is formed at the third image forming speed, processing proceeds to step S1207. In step S1207, the CPU 201 determines whether or not the current image forming speed set in the printing unit 1 is other than the third image forming speed. If the current image forming speed is the third image forming speed, the CPU 201 skips step S1208 and proceeds to step S1209. In step S1208, the CPU 201 switches to the third image forming speed in the printing unit 1. In step S1209, the CPU 201 corrects color misregistrations using the color misregistration amounts at the first image forming speed. This is based on the premise that the color misregistration amounts at the third image forming speed are substantially equal to the color misregistration amounts at the first image forming speed. In step S1210, the CPU 201 carries out the image forming operation at the third image forming speed by controlling the printing unit 1.

On the other hand, if the type of the paper S is not a paper type for which an image is formed at the third image forming speed in step S1206, the CPU 201 proceeds to step S1211. In step S1211, the CPU 201 determines whether or not the current image forming speed is other than the first image forming speed. If the current image forming speed is the first image forming speed, the CPU 201 skips step S1212 and proceeds to step S1213; if the current image forming speed is other than the first image forming speed, the CPU 201 proceeds to step S1212. In step S1212, the CPU 201 switches to the first image forming speed. In step S1213, the CPU 201 corrects color misregistrations using the color misregistration amounts at the first image forming speed. In step S1214, the CPU 201 carries out image formation at the first image forming speed by controlling the printing unit 1.

Thereafter, the CPU 201 proceeds to step S1215 and increments the first counter C1 by one. In step S1216, the CPU 201 increments the second counter C2 by one.

FIG. 9C shows values of color misregistration correction amounts at the first, second and third image forming speeds based on the color misregistration amounts shown in FIGS. 8A and 8B. As is apparent from FIG. 9C, the color misregistration correction amounts at the first image forming speed are the same as the color misregistration correction amounts at the third image forming speed, whereas the color misregistration correction amounts at the second image forming speed are different.

(Effects)

In the present embodiment, the CPU 201 performs color misregistration detection at least at the first image forming speed when the number of sheets of paper on which images have been formed exceeds Th2 (e.g., 300 sheets of paper) or when the temperature at the time of previous color misregistration detection has changed by Th3 (e.g., 3° C.) or more. In this way, even if the internal temperature of the image forming apparatus has changed, the CPU 201 can form images while suppressing color misregistrations. The reason why the color misregistration detection is performed not only when the temperature has changed but also once every predetermined number of sheets of paper is because there is a case in which the temperature detected by the thermistor 50 is not consistent with a temperature change in the laser scanners 104 that could be the factor of color misregistrations.

The CPU 201 performs color misregistration detection at both of the first and second image forming speeds each time the number of sheets of paper on which images have been formed exceeds Th1 (e.g., 10000 sheets of paper). That is to say, the CPU 201 makes a transition to an update mode when the number of sheets of paper on which images have been formed exceeds Th1. Consequently, detection differences are updated. In image formation at the second image forming speed, the CPU 201 performs color misregistration correction using the color misregistration amounts detected at the first image forming speed and the detection differences. The color misregistration amounts at the second image forming speed may gradually change with respect to the color misregistration amounts at the first image forming speed in accordance with the state of deterioration of the intermediate transfer belt. Even in this case, the present embodiment allows for suppression of color misregistrations while reducing downtime incurred to the user. That is to say, as the CPU 201 performs color misregistration detection at the second image forming speed with low frequency, downtime incurred to the user is reduced. The color misregistration amounts at the third image forming speed may not change with respect to the color misregistration amounts at the first image forming speed in accordance with the state of deterioration of the intermediate transfer belt. In this case, the CPU 201 need not perform the color misregistration detection at the third image forming speed. By thus omitting the color misregistration detection at the third image forming speed, the CPU 201 can reduce downtime. It should be noted that an instruction for making a transition to the update mode may be issued from the operation unit 220.

In the present embodiment, when the color misregistration detection is performed at both of the first and second image forming speeds, the CPU 201 first performs the color misregistration detection at the first image forming speed if the current image forming speed is the first image forming speed. On the other hand, the CPU 201 first performs the color misregistration detection at the second image forming speed if the current image forming speed is the second image forming speed. In this way, the frequency of switching among image forming speeds can be lowered, and downtime incurred to the user can be reduced.

In the description of the present embodiment, it is assumed that the CPU 201 performs the color misregistration detection at the first and second image forming speeds once every Th1 sheets of paper. However, for example, with provision of a third counter C3, the CPU 201 may perform the color misregistration detection at the second image forming speed once every Th2 sheets of paper, store the result of the color misregistration detection at the second image forming speed, and reflect the result directly in color misregistration correction at the second image forming speed. While the CPU 201 does not perform color misregistration detection at the third image forming speed in the present embodiment, it may perform color misregistration detection at the first and third image forming speeds, store differences between the detection results, and reflect the differences in color misregistration correction at the third image forming speed, similarly to the case of the second image forming speed.

Second Embodiment

As described with reference to FIG. 10, in the first embodiment, it is assumed that the CPU 201 performs color misregistration detection in step S1003 after performing the image forming operation in step S1002. However, the image forming operation and the color misregistration detection may be reversed in order.

FIGS. 13A-13C show a flowchart showing processes of the color misregistration detection performed prior to the image forming operation. For the sake of simple explanation, processes that are the same as those in FIGS. 11A-11C are given the same reference numerals thereas. If the CPU 201 determines in step S1101 that both of the color misregistration detection at the first image forming speed and the color misregistration detection at the second image forming speed should be performed, the CPU 201 proceeds to step S1301. In step S1301, the CPU 201 determines whether or not a paper type designated in a print job is a paper type for which an image is formed at the first image forming speed. If the image forming speed that is set in the printing unit 1 at the time of completion of the color misregistration detection matches the image forming speed designated in the print job, the CPU 201 can skip switching among image forming speeds. This is why the determination process of step S1301 is necessary. If the paper type designated in the print job is a paper type for which an image is formed at the first image forming speed, the CPU 201 proceeds to step S1302. In step S1302, the CPU 201 determines whether or not the current image forming speed set in the printing unit 1 is the second image forming speed. If the current image forming speed is the second image forming speed, processing skips step S1303 and proceeds to step S1110. If the current image forming speed is other than the second image forming speed, the CPU 201 proceeds to step S1303 and switches to the second image forming speed in the printing unit 1. Thereafter, steps S1110 to S1125 are performed. That is to say, when the first image forming speed is designated in the print job, color misregistrations are detected at the second image forming speed first, and thereafter, color misregistrations are detected at the first image forming speed. The image forming speed that is set in the printing unit 1 at the end of the color misregistration detection matches the image forming speed that is indirectly designated in the print job. Therefore, the CPU 201 does not have to switch among image forming operations immediately after starting the image forming operation.

In step S1301, if the paper type designated in the print job is not a paper type for which an image is formed at the first image forming speed, processing proceeds to step S1115. That is to say, when the second image forming speed is designated in the print job, color misregistrations are detected at the first image forming speed first, and thereafter, color misregistrations are detected at the second image forming speed. Hence, the image forming speed that is set in the printing unit 1 at the end of the color misregistration detection matches the image forming speed that is indirectly designated in the print job. Therefore, the CPU 201 does not have to switch among image forming operations immediately after starting the image forming operation.

Third Embodiment

In the above-described embodiments, the following conditions are set: the first detection condition for performing processing for obtaining color misregistration amounts at the first and second image forming speeds, and the second detection condition for performing processing for obtaining only color misregistration amounts at the first image forming speed. In the following description, control for obtaining only color misregistration amounts at the first image forming speed is referred to as first obtainment control, whereas control for consecutively obtaining color misregistration amounts at the first and second image forming speeds is referred to as second obtainment control. In the above-described embodiments, as a specific example, the first obtainment control is performed each time images are formed on 300 sheets of paper, whereas the second obtainment control is performed each time images are formed on 10000 sheets of paper. In this way, a second frequency at which the second obtainment control is performed can be set to be lower than a first frequency at which the first obtainment control is performed. In the present embodiment, when a timing for performing the first obtainment control is reached, the length of a period up to when the second obtainment control is performed next is determined, and if the determined length of the period is smaller than a predetermined value, the second obtainment control is performed in place of the first obtainment control. The following describes the present embodiment with a focus on differences from the first embodiment.

Figure 14A:
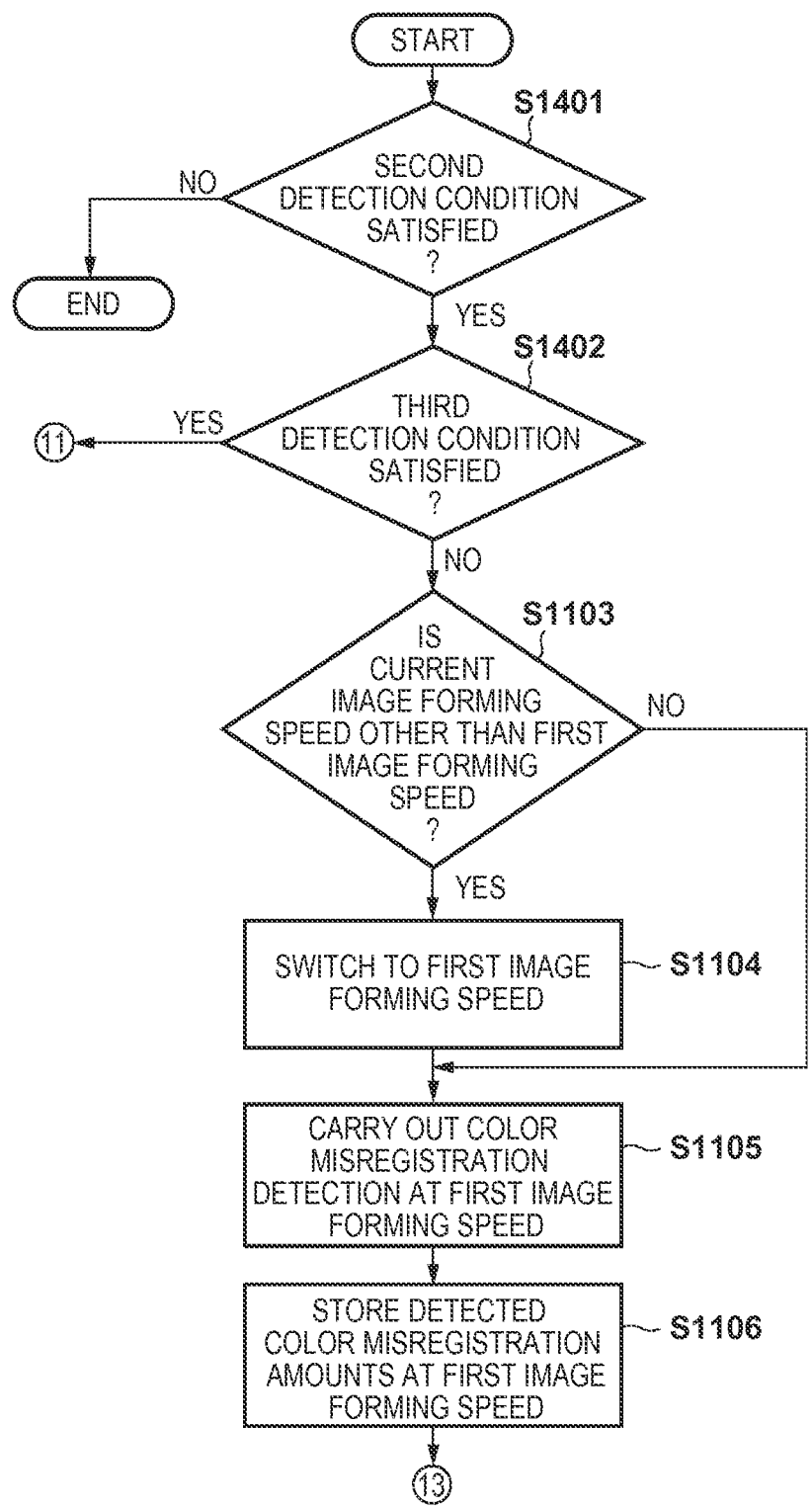
FIGS. 14A to 14C are flowcharts showing one example of color misregistration detection.
Figure 14B:
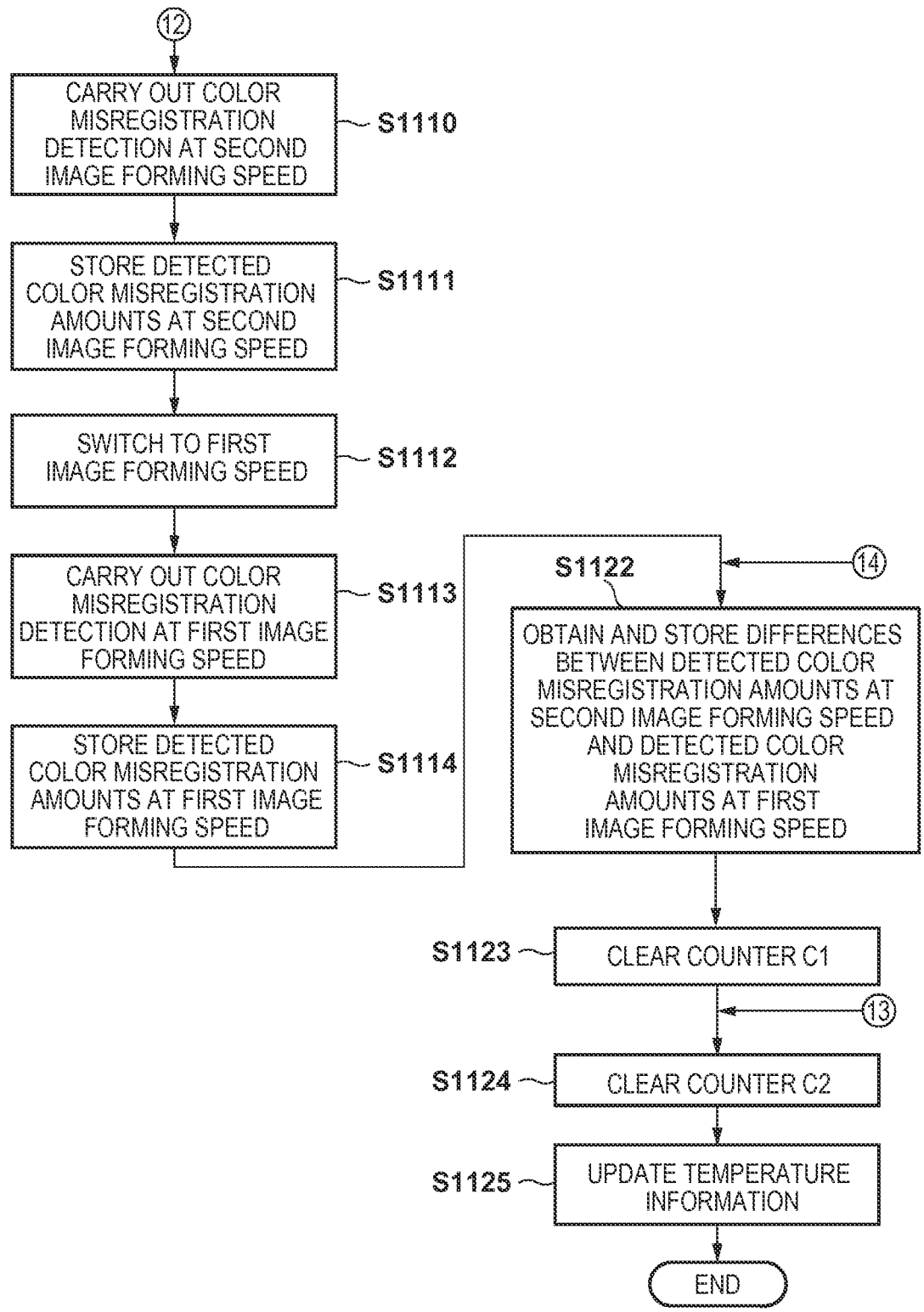
Figure 14C:
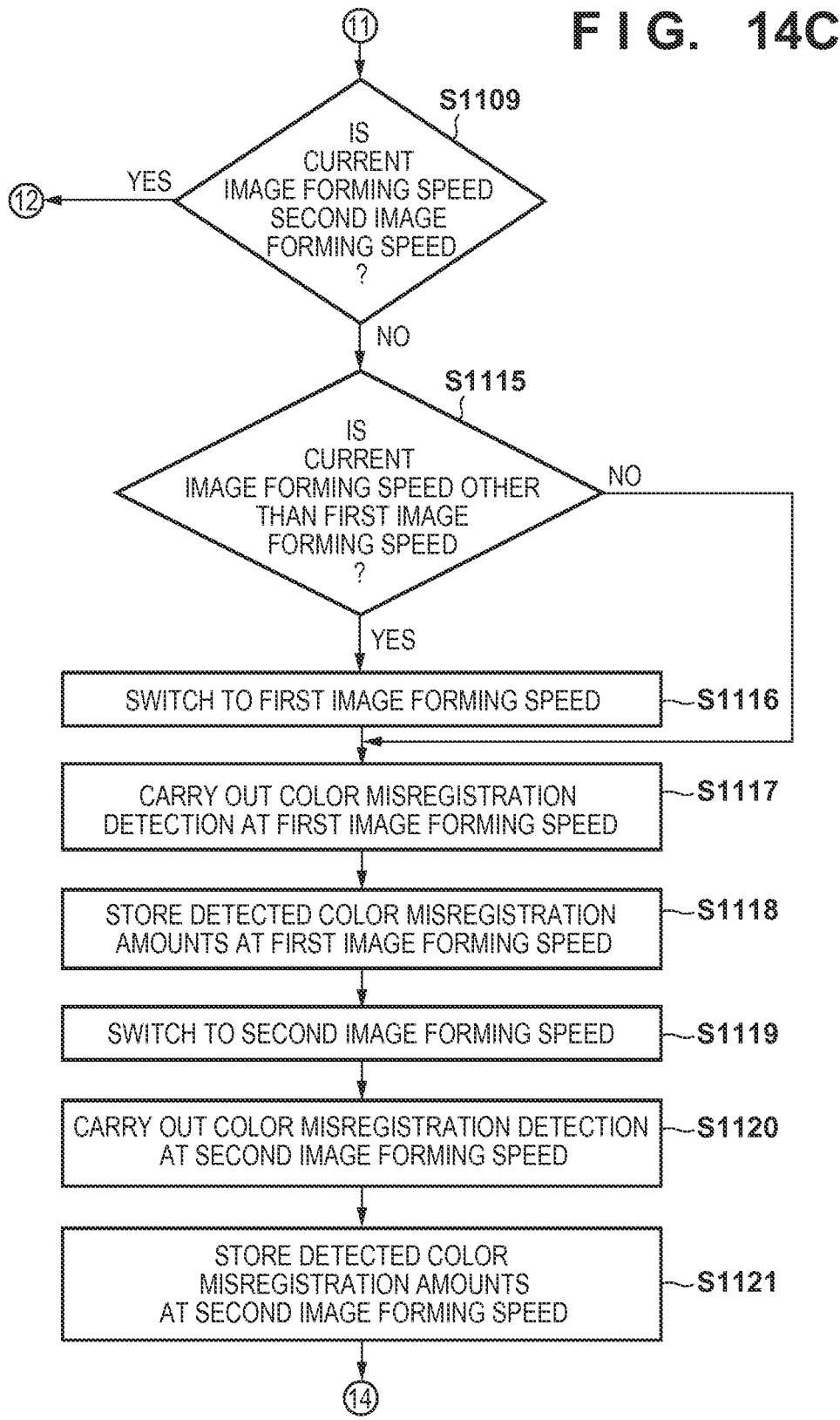

FIGS. 14A-14C are flowcharts of color misregistration detection processing according to the present embodiment. It should be noted that, among processes of FIGS. 14A-14C, processes that are the same as those of FIGS. 11A-C are given the same signs thereas, and a specific description thereof will be omitted. In step S1401, the CPU 201 determines whether or not the second detection condition is satisfied. As in the first embodiment, the second detection condition is satisfied if the second counter C2 exceeds the threshold Th2, or if the difference between the temperature that was measured when previous color misregistration detection was performed and the current measured temperature is equal to or larger than the threshold temperature Th3. If the second detection condition is not satisfied, the CPU 201 ends processing. On the other hand, if the second detection condition is satisfied, the CPU 201 determines whether or not a third detection condition is satisfied in step S1402. Here, the length of a period up to satisfaction of the first detection condition is determined on a predetermined basis, and the third detection condition is satisfied in a case where the determined basis is smaller than the predetermined value. In the present example, a value obtained by subtracting the count value of the first counter C1 from the threshold Th1 according to the first embodiment is used as an indicator of the length of the period up to satisfaction of the first detection condition. In a case where this value is smaller than a threshold Th4, the third detection condition is satisfied. It should be noted that, for example, a value equal to or smaller than the threshold Th2 can be set as the threshold Th4. In a case where the third detection condition is not satisfied, that is to say, if the number of sheets of paper on which images are to be formed until the next second obtainment control is performed is equal to or larger than the threshold Th4, the CPU 201 performs processes from step S1103. It should be noted that the processes from step S1103 are equivalent to the first obtainment control. On the other hand, in a case where the third detection condition is satisfied, that is to say, if the number of sheets of paper on which images are to be formed until the next second obtainment control is performed is smaller than the threshold Th4, processes from step S1109 are performed. It should be noted that the processes from step S1109 are equivalent to the second obtainment control.

The second obtainment control is intended to obtain color misregistration amounts at both of the first and second image forming speeds, that is to say, includes the first obtainment control. Therefore, the processing shown in FIG. 14 allows for prevention of a situation in which the color misregistration amounts at the first image forming speed are obtained twice in a short amount of time. For example, assume that the threshold Th1 is 10000, the threshold Th2 is 300, the threshold Th4 is 300, the first counter C1 is 9850, and the second counter C2 is 250. If 50 more sheets of paper are printed from this state, the first counter C1 and the second counter C2 reach 9900 and 300, respectively, and therefore the second detection condition is satisfied. The CPU 201 accordingly confirms whether or not the third detection condition is satisfied in step S1402. In the present example, the third detection condition is satisfaction of 10000−C1<300; as C1 is 9900, the third detection condition is satisfied here. Therefore, the CPU 201 performs the second obtainment control, and then clears the first counter C1 and the second counter C2.

On the other hand, according to the first embodiment, the first obtainment control is performed when the 50 sheets of paper have been printed, at which point the first counter C1 reaches 9900. Hence, thereafter, the second obtainment control is performed when 100 more sheets of paper have been printed. That is to say, after the color misregistration amounts at the first image forming speed are obtained in the first obtainment control, following the printing of the 100 sheets of paper, the color misregistration amounts at the first image forming speed are obtained again in the second obtainment control. In view of this, the present embodiment shortens a time period for detection of color misregistration amounts, and allows for suppression of color misregistrations while reducing downtime incurred to the user. It should be noted that the process of step S1402 can be rephrased as follows: if the count value of the first counter C1 is equal to or larger than a threshold Th5, the processes from step S1109 are performed; otherwise, the process of step S1103 is performed. A value obtained by subtracting a predetermined value from the threshold Th1 can be set as the threshold Th5; as the predetermined value, for example, a value equal to or smaller than the threshold Th2 can be used. For example, provided that the threshold Th1 is 10000, the threshold Th2 is 300, and the predetermined value is 300, the threshold Th5 is 99700.

<Summary>

In the present embodiment, at a first timing when the second detection condition is satisfied, the CPU 201 controls the printing unit 1, the pattern sensor 112, and the like to form a plurality of patterns and perform measurement regarding the plurality of patterns at the first image forming speed. On the other hand, at a second timing when the first detection condition is satisfied, the CPU 201 controls the printing unit 1, the pattern sensor 112, and the like to form a plurality of patterns and perform measurement regarding the plurality of patterns at the second image forming speed. Conventionally, color misregistration amounts have been measured at a single image forming speed, and the results of the measurement have been used in color misregistration correction at a plurality of image forming speeds. This is because color misregistration amounts attributed to short-term factors, such as a temperature change, do not depend on an image forming speed. Meanwhile, in a case where an intermediate transfer member that rotates due to a frictional force against a roller, such as the intermediate transfer belt 13a, is adopted as an image carrier, color misregistration amounts attributed to long-term factors are evident. The color misregistration amounts attributed to long-term factors may tend to differ among a plurality of image forming speeds. Therefore, by measuring color misregistration amounts and applying them to color misregistration correction also at the second image forming speed at the second timing, color misregistrations can be corrected appropriately also at the second image forming speed.

The first image forming speed may be higher than the second image forming speed. A processing time period for formation and measurement of patterns is shorter at a high image forming speed than at a low image forming speed. This makes it easy to reduce downtime, which is a time period in which the user cannot form images.

The CPU 201 may control the printing unit 1 and the pattern sensor 112 to form a plurality of patterns and perform measurement regarding the plurality of patterns at the first image forming speed also at the second timing. That is to say, at the second timing when the first condition is satisfied, color misregistrations are measured at both of the first and second image forming speeds. In this way, color misregistration amounts at the first image forming speed and color misregistration amounts at the second image forming speed can be measured under the substantially same environmental condition. In particular, when the second timing is reached, the CPU 201 may consecutively perform formation and measurement of the plurality of patterns at the first image forming speed and formation and measurement of the plurality of patterns at the second image forming speed. This makes it possible to approximate measurement conditions for the color misregistration amounts at the first image forming speed and the color misregistration amounts at the second image forming speed.

The CPU 201 may determine that the second timing is reached when a count value of the first counter C1 exceeds a first threshold Th1. Also, the CPU 201 may determine that the first timing is reached when a count value of the second counter C2 exceeds a second threshold Th2. In this way, the CPU 201 may make a judgment about a timing at which the color misregistration amounts need to be measured at least at the first image forming speed, as well as a timing at which the color misregistration amounts need to be measured at least at the second image forming speed, in accordance with the number of sheets of paper on which images have been formed. The number of sheets of paper on which images have been formed is a physical parameter that is useful in a judgment about short-term changes and long-term changes (deterioration) in the components of the image forming apparatus. Furthermore, as this is an easy-to-count parameter, processing for counting the number of sheets of paper on which images have been formed has an advantage of being easily configured in the image forming apparatus. It should be noted that, in a case where the first threshold Th1 is larger than the second threshold Th2, the first timing is particularly reached with high frequency, and therefore the second timing is reached with low frequency. Consequently, the CPU 201 can lower the frequency of measurement of color misregistration amounts at the second image forming speed, and hence the downtime can be reduced as well.

As described in relation to step S1102, the CPU 201 may determine that the first timing is reached when a difference between the current temperature Xc detected by the thermistor 50 and a temperature X that was stored in the storage apparatus at the time of performing measurement regarding the plurality of patterns becomes equal to or larger than a third threshold. When the internal temperature of the image forming apparatus changes, optical components involved in laser beams expand and shrink, and therefore color misregistrations easily occur. In view of this, by focusing on the temperature change, color misregistration amounts (correction values) can be updated appropriately, with more ease, at a timing when color misregistrations easily occur. Furthermore, the accuracy of color misregistration correction will be improved.

When toner images are formed at the first image forming speed, the CPU 201 corrects write start timings of toner images in colors other than the reference color based on intervals measured at the first image forming speed. When toner images are formed at the second image forming speed, the CPU 201 may correct write start timings of toner images in colors other than the reference color based on the differences dL1 to dL3 and on the intervals measured at the first image forming speed (the color misregistration amounts ΔL1 to ΔL3). As stated earlier, the differences dL1 to dL3 are differences between intervals measured at the first image forming speed and intervals measured at the second image forming speed, and in particular are differences between color misregistration amounts.

It should be noted that the CPU 201 may not perform formation and measurement of patterns at the third image forming speed that yields color misregistration amounts analogous to color misregistration amounts at the first image forming speed. In this case, when toner images are formed at the third image forming speed, the CPU 201 corrects write start timings of toner images in colors other than the reference color based on intervals measured at the first image forming speed. This has an advantage of reducing downtime related to the third image forming speed. In a case where the third image forming speed is lower than the first image forming speed and higher than the second image forming speed, color misregistration amounts at the third image forming speed tend to be analogous to color misregistration amounts at the first image forming speed. In a case where they are not analogous, measurement and correction of color misregistrations may be carried out at the third image forming speed, similarly to the case of the second image forming speed.

The carrier may be an intermediate transfer member that is driven by a frictional force. In particular, the intermediate transfer member may be the intermediate transfer belt 13a that is driven by the driving roller 13b. The intermediate transfer belt 13a rotates by being driven by a frictional force acting against the driving roller 13b. This means that, if the intermediate transfer belt 13a deteriorates, slippage occurs and color misregistration amounts easily change. Therefore, with regard to an intermediate transfer member driven by a frictional force, such as the intermediate transfer belt 13a, the CPU 201 corrects color misregistrations with high accuracy by individually measuring color misregistration amounts not only at the first image forming speed but also at the second image forming speed.

Incidentally, as described with reference to FIG. 10, the CPU 201 has a control mode in which the image forming operation is performed on a paper-by-paper basis and a control mode in which color misregistration detection is performed. That is to say, the CPU 201 functions as a first operation control unit that performs the image forming operation in accordance with a print job, and also as a second operation control unit that performs measurement of color misregistrations. In the image forming mode, the CPU 201 performs first operation control for transferring, to a sheet of paper, toner images in different colors that have been formed by the plurality of image forming units on the intermediate transfer member by driving the plurality of image forming units and the intermediate transfer member in accordance with an image forming speed designated from among a plurality of image forming speeds. On the other hand, in the measuring mode, the CPU 201 forms, on the intermediate transfer member, patterns for correcting positional misalignments of images in colors other than the reference color with respect to an image in the reference color by driving the plurality of image forming units and the intermediate transfer member in accordance with the designated image forming speed. Then, second operation control is performed for measuring misalignment amounts of the patterns in colors other than the reference color with respect to the pattern in the reference color formed on the intermediate transfer member. In particular, the CPU 201 performs the second operation control at the first image forming speed at the first timing, and performs the second operation control at the second image forming speed at the second timing. Furthermore, in a case where images are formed at the first image forming speed, the CPU 201 corrects positions of images in colors other than the reference color in accordance with misalignment amounts measured at the first image forming speed. On the other hand, in a case where images are formed at the second image forming speed, it corrects positions of images in colors other than the reference color in accordance with misalignment amounts measured at least at the second image forming speed. Consequently, the above-described effects are achieved.

Moreover, when color misregistration amounts at the first image forming speed are to be obtained at the first timing, the CPU 201 can determine the length of a period up to when the second timing is reached next on a predetermined basis. It is possible to adopt a configuration in which, if the determined length of the period is smaller than a predetermined value, the next second timing can be advanced, thereby obtaining color misregistration amounts at both of the first and second image forming speeds. This configuration allows for prevention of a situation in which the color misregistration amounts at the first image forming speed are obtained twice in a short amount of time. It should be noted that the CPU 201 can consider the number of sheets of paper on which images are to be formed until the second timing is reached next as a period up to when the second timing is reached next. This is because the smaller the number of sheets of paper on which images are to be formed until the second timing is reached next, the shorter the period up to when the second timing is reached next. However, the length of the period up to when the second timing is reached next can be determined by other indicators. It should be noted that, in a case where the number of sheets of paper on which images are to be formed is used, the CPU 201 can determine that the determined length of the period is smaller than the predetermined value if, for example, the number of sheets of paper on which images are to be formed until the second timing is reached next is smaller than a fourth threshold Th4.

It should also be noted that the process of step S1402 can be rephrased as follows: if the count value of the first counter C1 is equal to or larger than a fifth threshold Th5, the processes from step S1109 are performed; otherwise, the process of step S1103 is performed. A value obtained by subtracting a predetermined value from the first threshold Th1 can be set as the fifth threshold Th5; as the predetermined value, for example, a value equal to or smaller than the second threshold Th2 can be used. Therefore, the process of step S1402 can be rephrased as follows: in a case where the first timing is reached, the processes from step S1109 are performed if the second timing will be reached before the next first timing will be reached, and the process of step S1103 is performed otherwise. For example, provided that the threshold Th1 is 10000, the threshold Th2 is 300, and the predetermined value is 300, the threshold Th5 is 99700. This allows for prevention of a situation in which the color misregistration amounts at the first image forming speed are obtained multiple times in a short amount of time, as well as reduction of downtime.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-034713, filed on Feb. 25, 2014 which is hereby incorporated by reference herein in its entirety.

What is claimed is:

1. An image forming apparatus that is capable of forming an image at a plurality of image forming speeds, the image forming apparatus comprising:
    an image forming unit that has a first image forming part configured to form a first image of a first color and a second image forming part configured to form a second image of a second color different from the first color, and configured to form the image using the first image forming part and the second image forming part;
    an image bearing member configured to bear the first image and the second image, and to convey the first image and the second image;
    a controller configured to control the image forming unit to form a measurement image including a first measurement image of the first color and a second measurement image of the second color on the image bearing member;
    a measurement unit configured to measure the measurement image formed on the image bearing member;
    a determination unit configured to determine first information related to a relative position of the first measurement image and the second measurement image in a conveyance direction of the image bearing member based on a first measurement result of the measurement image, by the measurement unit, formed by the image forming unit at a first image forming speed, and to determine second information related to a relative position of the first measurement image and the second measurement image in the conveyance direction of the image bearing member based on a second measurement result of the measurement image, by the measurement unit, formed by the image forming unit at a second image forming speed different from the first image forming speed;
    a generating unit configured to generate correlation data based on the first information and the second information determined by the determination unit; and
    a correction unit configured to, in a case where the image forming unit forms the image at the first image forming speed, correct a relative position of the first image and the second image in the conveyance direction based on the first information determined by the determination unit, and to, in a case where the image forming unit forms the image at the second image forming speed, correct a relative position of the first image and the second image in the conveyance direction based on the first information determined by the determination unit and the correlation data generated by the generating unit;
    wherein
    the controller is further configured to control the image forming unit to form the measurement image at the first image forming speed in a case where a first condition is satisfied, and to control the image forming unit to form the measurement image at both the first image forming speed and the second image forming speed in a case where a second condition is satisfied, and
    the controller is further configured to, in a case where the first condition is satisfied, determine whether or not the second condition is satisfied before the first condition is satisfied next, and in a case where the second condition is satisfied before the first condition is satisfied next, cause the image forming unit to form the measurement image at both the first image forming speed and the second image forming speed.

2. The image forming apparatus according to claim 1, wherein
    the first condition is satisfied with higher frequency than the second condition.

3. The image forming apparatus according to claim 1, further comprising
    a number count unit configured to count a number of images formed by the image forming unit,
wherein
    the second condition is satisfied in a case where a number counted by the number count unit exceeds a first threshold.

4. The image forming apparatus according to claim 3, wherein
    the first condition is satisfied in a case where the number counted by the number count unit exceeds a second threshold, and
    the first threshold is larger than the second threshold.

5. The image forming apparatus according to claim 1, further comprising a first number count unit configured to count a number of images formed by the image forming unit after forming the measurement image at the first image forming speed, and a second number count unit configured to count a number of images formed by the image forming unit after forming the measurement image at both the first image forming speed and the second image forming speed, the first condition is satisfied in a case where a number counted by the first number count unit exceeds a first threshold, the second condition is satisfied in a case where a number counted by the second number count unit exceeds a second threshold, and the second threshold is larger than the first threshold.

6. The image forming apparatus according to claim 1, wherein the first image forming speed is higher than the second image forming speed.

* * * * *